US012739073B2

(12) United States Patent
Khoshnevisan et al.

(10) Patent No.: US 12,739,073 B2
(45) Date of Patent: Sep. 15, 2026

(54) APERIODIC REFERENCE SIGNAL MEASUREMENTS FOR MULTIPLE TRANSMISSION AND RECEPTION POINTS

(71) Applicant: QUALCOMM INCORPORATED, San Diego, CA (US)

(72) Inventors: Mostafa Khoshnevisan, San Diego, CA (US); Sony Akkarakaran, Poway, CA (US); Srinivas Yerramalli, San Diego, CA (US); Alexandros Manolakos, Escondido, CA (US); Mukesh Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 565 days.

(21) Appl. No.: 18/042,582

(22) PCT Filed: Oct. 13, 2021

(86) PCT No.: PCT/US2021/071832
§ 371 (c)(1),
(2) Date: Feb. 22, 2023

(87) PCT Pub. No.: WO2022/087564
PCT Pub. Date: Apr. 28, 2022

(65) Prior Publication Data

US 2024/0014965 A1 Jan. 11, 2024

(30) Foreign Application Priority Data

Oct. 22, 2020 (IN) ............................ 202041046075

(51) Int. Cl.
*H04L 5/00* (2006.01)
*H04B 7/024* (2017.01)

(52) U.S. Cl.
CPC .......... *H04L 5/0048* (2013.01); *H04B 7/024* (2013.01); *H04L 5/0094* (2013.01)

(58) Field of Classification Search
CPC ..... H04B 7/024; H04L 5/0035; H04L 5/0048; H04L 5/0094
See application file for complete search history.

(56) References Cited

U.S. PATENT DOCUMENTS

2021/0184819 A1* 6/2021 Takeda .................. H04W 24/10
2022/0124664 A1* 4/2022 Cha ...................... H04W 64/00

(Continued)

FOREIGN PATENT DOCUMENTS

WO WO-2021162835 A1 8/2021
WO WO-2022033654 A1 * 2/2022 ............ H04B 7/022

OTHER PUBLICATIONS

Apple Inc: "Remaining Issues on Rel-16 Multi-TRP Enhancement", 3GPP Draft, R1-2008436, 3GPP TSG-RAN WG1 Meeting #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020 (Oct. 17, 2020), XP051940150, 14 Pages, Sections 3 and 4.

(Continued)

*Primary Examiner* — Awet Haile
(74) *Attorney, Agent, or Firm* — Holland & Hart LLP /Qualcomm

(57) ABSTRACT

Methods, systems, and devices for wireless communications are described. Generally, the described techniques allow a user equipment (UE) to efficiently identify a trigger state that is linked to a configuration for receiving and measuring reference signals from a transmission and reception point (TRPs). The UE may receive an indication of different lists of trigger states associated with different TRPs, and, when the UE receives downlink control information (DCI) indi- (Continued)

cating a trigger state index, the UE may reference an appropriate list to identify the trigger state corresponding to the trigger state index. In particular, the UE may determine a control resource set (CORESET) pool index of a CORESET in which the DCI is received, and the UE may identify the trigger state corresponding to the trigger state index from a list of trigger states associated with the CORESET pool index.

30 Claims, 18 Drawing Sheets

(56) References Cited

U.S. PATENT DOCUMENTS

2023/0171623 A1* 6/2023 Zeineddine ........... H04L 5/0057 370/252
2023/0254811 A1* 8/2023 Wang .................. H04W 64/006 370/330

OTHER PUBLICATIONS

International Search Report and Written Opinion—PCT/US2021/071832—ISA/EPO—Feb. 8, 2022.
ZTE: "Maintenance of Multi-TRP Enhancements", 3GPP Draft, R1-2001596, 3GPP TSG RAN WG1 Meeting #100bis-e, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875187, 13 Pages, Sections 2 and 3.

* cited by examiner

500

700

900

1300

APERIODIC REFERENCE SIGNAL MEASUREMENTS FOR MULTIPLE TRANSMISSION AND RECEPTION POINTS

CROSS REFERENCES

The present application is a 371 national stage filing of International PCT Application No. PCT/US2021/071832 by Khoshnevisan et al. entitled "APERIODIC REFERENCE SIGNAL MEASUREMENTS FOR MULTIPLE TRANSMISSION AND RECEPTION POINTS," filed Oct. 13, 2021; and claims priority to Indian Patent Application No. 202041046075 by Khoshnevisan et al. entitled "APERIODIC REFERENCE SIGNAL MEASUREMENTS FOR MULTIPLE TRANSMISSION AND RECEPTION POINTS," filed Oct. 22, 2020, each of which is assigned to the assignee hereof, and each of which is expressly incorporated by reference in its entirety herein.

FIELD OF TECHNOLOGY

The following relates to wireless communications including aperiodic reference signal measurements for multiple transmission and reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may support communications with multiple transmission and reception points (TRPs) to improve throughput or improve the reliability of communications. In such systems, it may be appropriate for the UE to perform measurements on reference signal transmissions received from each TRP to identify suitable configurations for communicating with each TRP. Improved techniques for facilitating transmitting, receiving, and measuring reference signal transmissions may be desirable.

SUMMARY

The described techniques relate to improved methods, systems, devices, and apparatuses that support aperiodic reference signal measurements for multiple transmission and reception points (TRPs). Generally, the described techniques allow a UE to efficiently identify a trigger state that is linked to a configuration for receiving and measuring reference signals from a TRP. The UE may receive an indication of different lists or sets of trigger states associated with different TRPs, and, when the UE receives downlink control information (DCI) indicating a trigger state index, the UE may reference an appropriate list or set to identify the trigger state corresponding to the trigger state index. In particular, the UE may determine a control resource set (CORESET) pool index of a CORESET in which the DCI is received, and the UE may identify the trigger state corresponding to the trigger state index from a list of trigger states associated with the CORESET pool index. Because different TRPs may transmit DCI in CORESETs associated with different CORESET pool indices, the UE may be able to differentiate between DCI from different TRPs, and the UE may be able to identify a trigger state indicated by a TRP from a list of trigger states configured for that TRP.

A method of wireless communication at a UE is described. The method may include receiving one or more control messages indicating a first list of trigger states associated with a first control resource set pool index and a second list of trigger states associated with a second control resource set pool index, receiving downlink control information including a trigger state index in a control resource set having the first control resource set pool index, identifying a trigger state corresponding to the trigger state index in the first list of trigger states based on the control resource set having the first control resource set pool index, and receiving one or more reference signal transmissions based on a configuration linked to the identified trigger state.

An apparatus for wireless communication at a UE is described. The apparatus may include a processor, memory coupled with the processor, and instructions stored in the memory. The instructions may be executable by the processor to cause the apparatus to receive one or more control messages indicating a first list of trigger states associated with a first control resource set pool index and a second list of trigger states associated with a second control resource set pool index, receive downlink control information including a trigger state index in a control resource set having the first control resource set pool index, identify a trigger state corresponding to the trigger state index in the first list of trigger states based on the control resource set having the first control resource set pool index, and receive one or more reference signal transmissions based on a configuration linked to the identified trigger state.

Another apparatus for wireless communication at a UE is described. The apparatus may include means for receiving one or more control messages indicating a first list of trigger states associated with a first control resource set pool index and a second list of trigger states associated with a second control resource set pool index, receiving downlink control information including a trigger state index in a control resource set having the first control resource set pool index, identifying a trigger state corresponding to the trigger state index in the first list of trigger states based on the control resource set having the first control resource set pool index, and receiving one or more reference signal transmissions based on a configuration linked to the identified trigger state.

A non-transitory computer-readable medium storing code for wireless communication at a UE is described. The code may include instructions executable by a processor to receive one or more control messages indicating a first list of trigger states associated with a first control resource set pool index and a second list of trigger states associated with a second control resource set pool index, receive downlink control information including a trigger state index in a control resource set having the first control resource set pool index, identify a trigger state corresponding to the trigger state index in the first list of trigger states based on the control resource set having the first control resource set pool index, and receive one or more reference signal transmissions based on a configuration linked to the identified trigger state.

In some examples of the method, apparatuses, and non-transitory computer-readable medium described herein, receiving the one or more control messages indicating the first list of trigger states and the second list of trigger states may include operations, features, means, or instructions for receiving a first control message indicating the first list of trigger states associated with the first control resource set pool index, and receiving a second control message indicating the second list of trigger states associated with the second control resource set pool index.

In some examples of the method, apparatuses, and non-transitory computer-readable medium described herein, a field in the first control message indicates that the first control message corresponds to the first control resource set pool index, and where identifying the trigger state in the first list of trigger states may be based on the field in the first control message indicating that the first control message corresponds to the first control resource set pool index. In some examples of the method, apparatuses, and non-transitory computer-readable medium described herein, a data channel in which the first control message may be received may be associated with the first control resource set pool index, and where identifying the trigger state in the first list of trigger states may be based on the data channel being associated with the first control resource set pool index.

In some examples of the method, apparatuses, and non-transitory computer-readable medium described herein, receiving the one or more control messages indicating the first list of trigger states and the second list of trigger states may include operations, features, means, or instructions for receiving a single control message including a first field indicating the first list of trigger states associated with the first control resource set pool index and a second field indicating the second list of trigger states associated with the second control resource set pool index. In some examples of the method, apparatuses, and non-transitory computer-readable medium described herein, the first field indicating the first list of trigger states may be associated with the first control resource set pool index, and where identifying the trigger state in the first list of trigger states may be based on the first field being associated with the first control resource set pool index.

Some examples of the method, apparatuses, and non-transitory computer-readable medium described herein may further include operations, features, means, or instructions for receiving radio resource control signaling indicating a first set of one or more trigger states and a second set of one or more trigger states, where the first list of trigger states may be sub-selected from the first set of one or more trigger states and the second list of trigger states may be sub-selected from the second set of one or more trigger states. Some examples of the method, apparatuses, and non-transitory computer-readable medium described herein may further include operations, features, means, or instructions for receiving radio resource control signaling indicating a single set of one or more trigger states, where the first list of trigger states and the second list of trigger states may be each sub-selected from the single set of one or more trigger states. In some examples of the method, apparatuses, and non-transitory computer-readable medium described herein, the one or more control messages include medium access control (MAC) control elements.

Some examples of the method, apparatuses, and non-transitory computer-readable medium described herein may further include operations, features, means, or instructions for selecting the configuration for receiving the one or more reference signal transmissions based on the identified trigger state, receiving the one or more reference signal transmissions on resources linked to the selected configuration, and performing measurements on the one or more reference signal transmissions based on receiving the one or more reference signal transmissions. In some examples of the method, apparatuses, and non-transitory computer-readable medium described herein, the one or more reference signal transmissions include channel state information reference signal transmissions, synchronization signal block transmissions, tracking reference signal transmissions, or positioning reference signal transmissions.

Some examples of the method, apparatuses, and non-transitory computer-readable medium described herein may further include operations, features, means, or instructions for receiving, in the downlink control information, an indication that the UE is to transmit at least one report, and transmitting the at least one report based on the received one or more reference signal transmissions and the indication that the UE is to transmit the at least one report. In some examples of the method, apparatuses, and non-transitory computer-readable medium described herein, the downlink control information includes group-common downlink control information.

Some examples of the method, apparatuses, and non-transitory computer-readable medium described herein may further include operations, features, means, or instructions for performing measurements on the positioning reference signal transmissions, and transmitting at least one report indicating the measurements performed on the positioning reference signal transmissions. Some examples of the method, apparatuses, and non-transitory computer-readable medium described herein may further include operations, features, means, or instructions for performing measurements on the positioning reference signal transmissions, computing a position of the UE based on the measurements, and transmitting at least one report indicating the position of the UE.

A method of wireless communication is described. The method may include transmitting, to a UE, one or more control messages indicating a first list of trigger states associated with a first control resource set pool index and a second list of trigger states associated with a second control resource set pool index, identifying a trigger state in the first list of trigger states linked to a configuration for the UE to use to receive one or more reference signal transmissions, and transmitting, to the UE, downlink control information including a trigger state index in a control resource set having the first control resource set pool index, where the trigger state index corresponds to the identified trigger state in the first list of trigger states based on the control resource set having the first control resource set pool index.

An apparatus for wireless communication is described. The apparatus may include a processor, memory coupled with the processor, and instructions stored in the memory. The instructions may be executable by the processor to cause the apparatus to transmit, to a UE, one or more control messages indicating a first list of trigger states associated with a first control resource set pool index and a second list of trigger states associated with a second control resource set pool index, identify a trigger state in the first list of trigger states linked to a configuration for the UE to use to receive one or more reference signal transmissions, and transmit, to the UE, downlink control information including a trigger state index in a control resource set having the first control resource set pool index, where the trigger state index corresponds to the identified trigger state in the first list of trigger states based on the control resource set having the first control resource set pool index.

Another apparatus for wireless communication is described. The apparatus may include means for transmitting, to a UE, one or more control messages indicating a first list of trigger states associated with a first control resource set pool index and a second list of trigger states associated with a second control resource set pool index, identifying a trigger state in the first list of trigger states linked to a configuration for the UE to use to receive one or more reference signal transmissions, and transmitting, to the UE, downlink control information including a trigger state index in a control resource set having the first control resource set pool index, where the trigger state index corresponds to the identified trigger state in the first list of trigger states based on the control resource set having the first control resource set pool index.

A non-transitory computer-readable medium storing code for wireless communication is described. The code may include instructions executable by a processor to transmit, to a UE, one or more control messages indicating a first list of trigger states associated with a first control resource set pool index and a second list of trigger states associated with a second control resource set pool index, identify a trigger state in the first list of trigger states linked to a configuration for the UE to use to receive one or more reference signal transmissions, and transmit, to the UE, downlink control information including a trigger state index in a control resource set having the first control resource set pool index, where the trigger state index corresponds to the identified trigger state in the first list of trigger states based on the control resource set having the first control resource set pool index.

In some examples of the method, apparatuses, and non-transitory computer-readable medium described herein, transmitting the one or more control messages indicating the first list of trigger states and the second list of trigger states may include operations, features, means, or instructions for transmitting a first control message indicating the first list of trigger states associated with the first control resource set pool index, and transmitting a second control message indicating the second list of trigger states associated with the second control resource set pool index.

In some examples of the method, apparatuses, and non-transitory computer-readable medium described herein, a field in the first control message indicates that the first control message corresponds to the first control resource set pool index, and where the first control message may be linked to the first control resource set pool index based on the field. In some examples of the method, apparatuses, and non-transitory computer-readable medium described herein, a data channel in which the first control message may be transmitted may be associated with the first control resource set pool index, and where the first control message may be linked to the first control resource set pool index based on the data channel being associated with the first control resource set pool index.

In some examples of the method, apparatuses, and non-transitory computer-readable medium described herein, transmitting the one or more control messages indicating the first list of trigger states and the second list of trigger states may include operations, features, means, or instructions for transmitting a single control message including a first field indicating the first list of trigger states associated with the first control resource set pool index and a second field indicating the second list of trigger states associated with the second control resource set pool index. In some examples of the method, apparatuses, and non-transitory computer-readable medium described herein, the first field indicating the first list of trigger states may be associated with the first control resource set pool index and the second field indicating the second list of trigger states may be associated with the second control resource set pool index.

Some examples of the method, apparatuses, and non-transitory computer-readable medium described herein may further include operations, features, means, or instructions for transmitting radio resource control signaling indicating a first set of one or more trigger states and a second set of one or more trigger states, where the first list of trigger states may be sub-selected from the first set of one or more trigger states and the second list of trigger states may be sub-selected from the second set of one or more trigger states. Some examples of the method, apparatuses, and non-transitory computer-readable medium described herein may further include operations, features, means, or instructions for transmitting radio resource control signaling indicating a single set of one or more trigger states, where the first list of trigger states and the second list of trigger states may be each sub-selected from the single set of one or more trigger states. In some examples of the method, apparatuses, and non-transitory computer-readable medium described herein, the one or more control messages include MAC control elements.

Some examples of the method, apparatuses, and non-transitory computer-readable medium described herein may further include operations, features, means, or instructions for transmitting one or more reference signal transmissions according to the configuration linked to the identified trigger state. In some examples of the method, apparatuses, and non-transitory computer-readable medium described herein, the one or more reference signal transmissions include channel state information reference signal transmissions, synchronization signal block transmissions, tracking reference signal transmissions, or positioning reference signal transmissions.

Some examples of the method, apparatuses, and non-transitory computer-readable medium described herein may further include operations, features, means, or instructions for transmitting, in the downlink control information, an indication that the UE is to transmit at least one report, transmitting one or more reference signal transmissions according to the configuration linked to the identified trigger state, and receiving the at least one report from the UE indicating measurements performed on the one or more reference signal transmissions based on transmitting the indication. In some examples of the method, apparatuses, and non-transitory computer-readable medium described herein, the downlink control information includes group-common downlink control information.

Some examples of the method, apparatuses, and non-transitory computer-readable medium described herein may further include operations, features, means, or instructions for transmitting one or more positioning reference signal transmissions according to the configuration linked to the identified trigger state, and receiving at least one report from the UE indicating measurements performed on the positioning reference signal transmissions based on transmitting the one or more positioning reference signal transmissions. Some examples of the method, apparatuses, and non-transitory computer-readable medium described herein may further include operations, features, means, or instructions for transmitting one or more positioning reference signal transmissions according to the configuration linked to the identified trigger state, and receiving at least one report from the UE indicating a position of the UE based on transmitting the one or more positioning reference signal transmissions.

DETAILED DESCRIPTION

Figure 1:
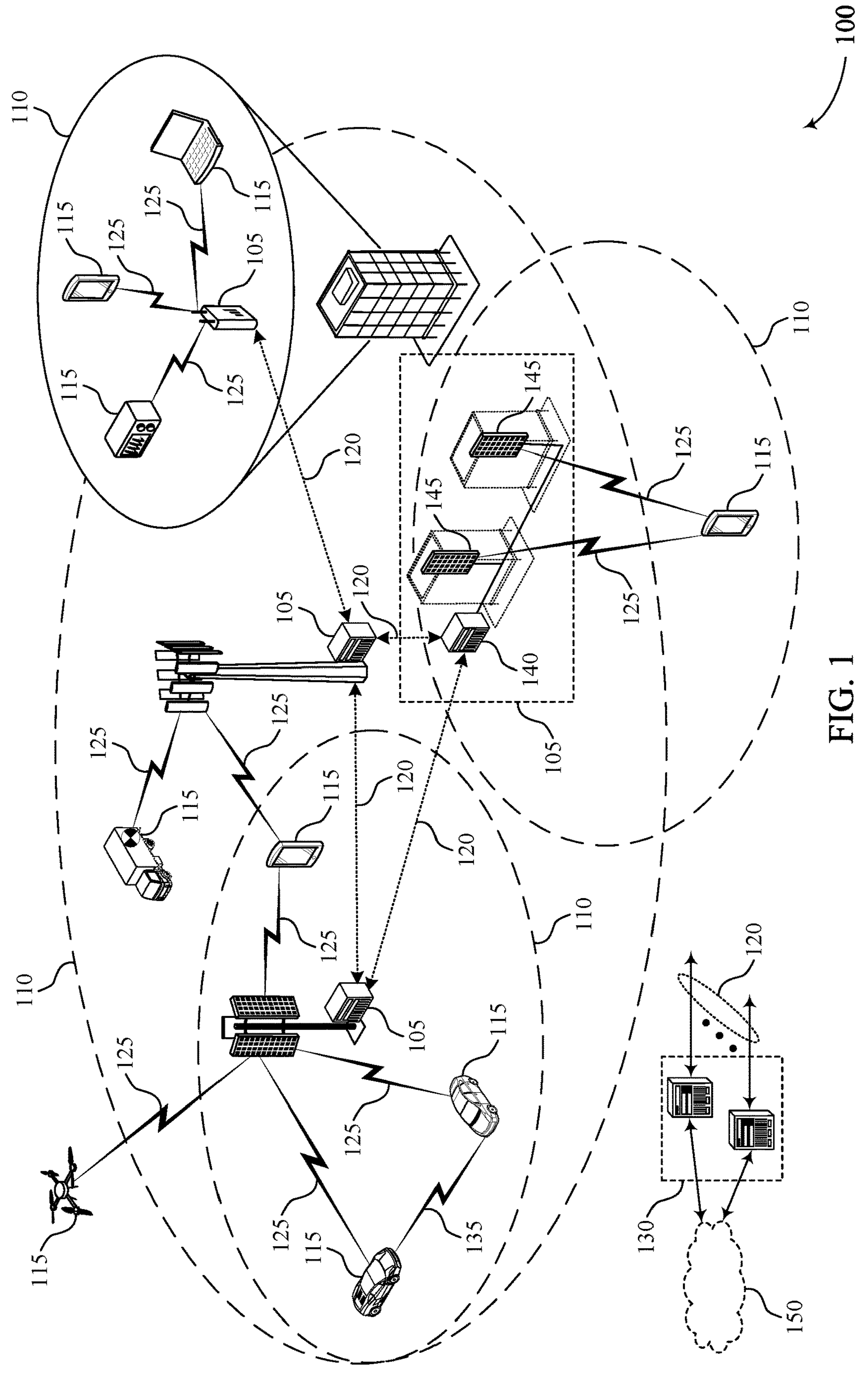
FIG. 1 illustrates an example of a wireless communications system that supports aperiodic reference signal measurements for multiple transmission and reception points (TRPs) in accordance with aspects of the present disclosure.

In some wireless communications systems, a user equipment (UE) may support communications with multiple transmission and reception points (TRPs) to improve throughput or improve the reliability of communications. For instance, when operating in a multi-TRP operation mode, the UE may simultaneously receive different downlink data from multiple TRPs, resulting in improved throughput, or the UE may receive the same downlink data from multiple TRPs, resulting in improved reliability (e.g., a higher chance that the data is received by the UE). In such systems, it may be appropriate for the UE to perform measurements on reference signals received from each TRP to identify suitable configurations for communicating with each TRP.

There may be multiple configurations for receiving and performing measurements on reference signals from a TRP, and one or more of these configurations may be linked to each of a number of trigger states. Accordingly, a base station may signal a trigger state to a UE in downlink control information (DCI), and the UE may use one of the configurations linked to the trigger state to receive and perform measurements on reference signals from the base station. In some cases, however, if the UE supports communications with multiple TRPs, the overhead of signaling a trigger state in DCI may be high. For instance, the DCI may indicate a trigger state from a list of trigger states supported by all of the multiple TRPs rather than a list of trigger states supported by the TRP transmitting the DCI. As a result, a large number of bits in the DCI may be used to indicate the trigger state, and the DCI may be underutilized.

As described herein, a wireless communications system may support efficient techniques to allow a UE to identify a trigger state with limited overhead. The UE may receive an indication of different lists or sets of trigger states associated with different TRPs, and, when the UE receives DCI indicating a trigger state index, the UE may reference an appropriate list or set to identify the trigger state corresponding to the trigger state index. In particular, the UE may determine a control resource set (CORESET) pool index of a CORESET in which the DCI is received, and the UE may identify the trigger state corresponding to the trigger state index from a list of trigger states associated with the CORESET pool index. Because different TRPs may transmit DCI in CORESETs associated with different CORESET pool indices, the UE may be able to differentiate between DCI from different TRPs, and the UE may be able to identify a trigger state indicated by a TRP from a list of trigger states configured for that TRP.

Aspects of the disclosure introduced above are described below in the context of a wireless communications system. Examples of processes and signaling exchanges that support aperiodic reference signal measurements for multiple TRPs are then described. Aspects of the disclosure are further illustrated by and described with reference to apparatus diagrams, system diagrams, and flowcharts that relate to aperiodic reference signal measurements for multiple TRPs.

FIG. 1 illustrates an example of a wireless communications system 100 that supports aperiodic reference signal measurements for multiple TRPs in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, a UE 115 may support communications with multiple TRPs to improve throughput or improve the reliability of communications. For instance, when operating in a multi-TRP operation mode, the UE 115 may simultaneously receive different downlink data from multiple TRPs, resulting in improved throughput, or the UE 115 may receive the same downlink data from multiple TRPs, resulting in improved reliability (e.g., a higher chance that the data is received by the UE 115). The multiple TRPs may be connected to one or more base stations 105, and the one or more base stations 105 may communicate with UEs 115 via the TRPs. In such systems, it may be appropriate for the UE 115 to perform measurements on reference signals received from each TRP to identify suitable configurations for communicating with each TRP. There may be multiple configurations for receiving and performing measurements on reference signals from a TRP, and one or more of these configurations may be linked to each of a number of trigger states. Wireless communications system 100 may support efficient techniques for signaling a trigger state to a UE 115 to allow the UE 115 to identify a suitable configuration for receiving and measuring reference signals from a TRP.

Figure 2:
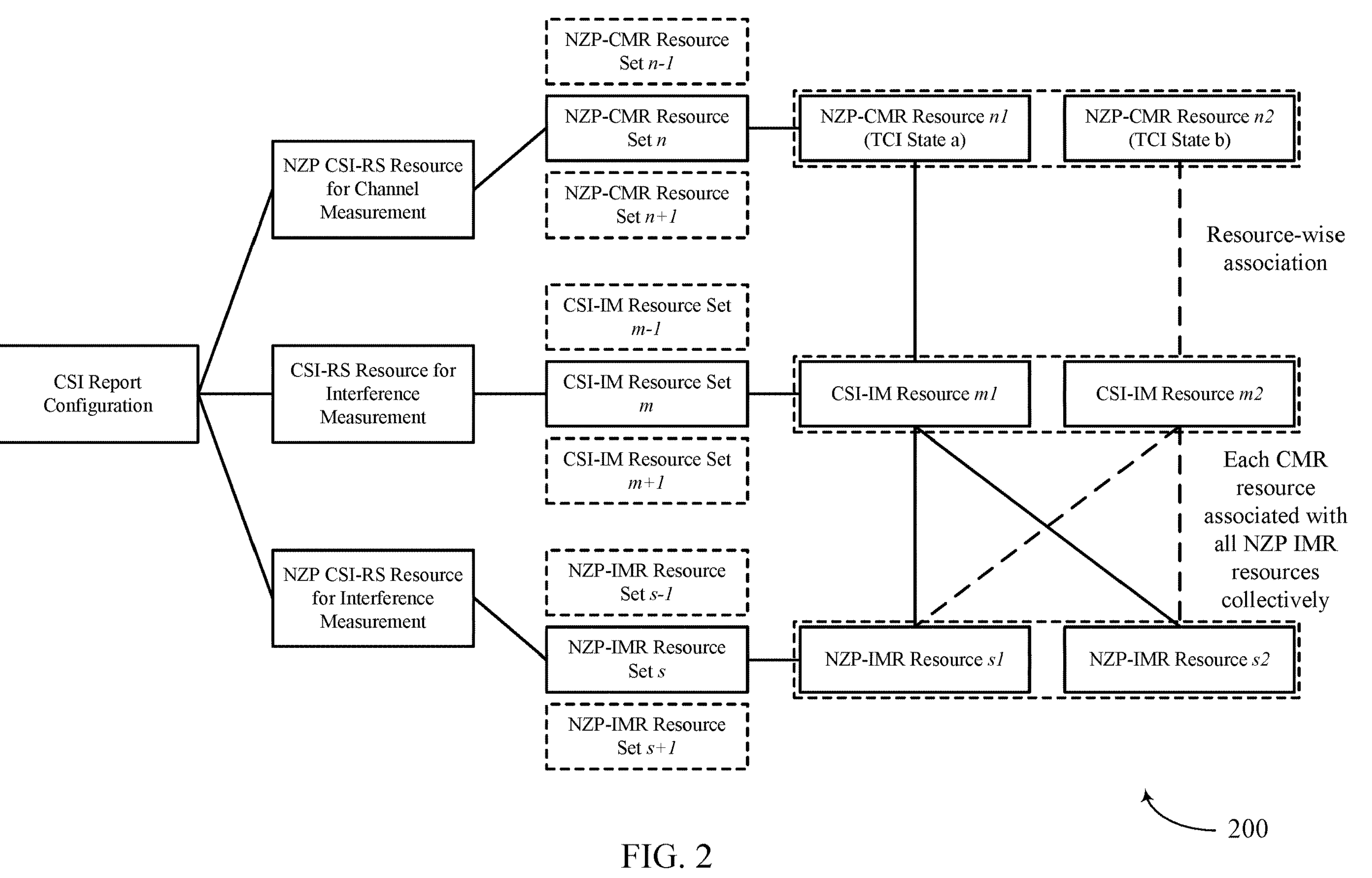
FIG. 2 illustrates an example of a channel state information (CSI) reference signal (CSI-RS) configuration in accordance with aspects of the present disclosure.

FIG. 2 illustrates an example of a channel state information (CSI) reference signal (CSI-RS) resource configuration 200 in accordance with aspects of the present disclosure. In some aspects, the CSI-RS resource configuration 200 may be implemented to realize aspects of the wireless communications system 100 and other aspects described herein. Although FIG. 2 illustrates a CSI-RS resource configuration 200 related to CSI-RSs, it is to be understood that similar configurations may be used for other reference signals, such as synchronization signal blocks (SSBs), tracking reference signals (TRSs), or positioning reference signals (PRSs).

A UE 115 may receive a control message indicating a CSI-RS resource configuration 200 corresponding to one or more CSI-RS resources that the UE 115 may monitor for CSI-RSs from multiple TRPs. For example, the UE 115 may receive the control message including a CSI report configuration (e.g., a CSI report config) indicating the CSI-RS resource configuration 200. The CSI report configuration may link to one or more resource settings associated with different measurement types. For instance, the CSI report configuration may link to one or more of a non-zero power (NZP) CSI-RS resource for channel measurement (CMR), a CSI-RS resource for interference measurement (CSI-IM), or an NZP CSI-RS for interference measurement (NZP-IMR), or any combination thereof.

Each resource setting of the one or more resource settings may be associated with multiple resource sets, and one of the resource sets may be active (e.g., there may be only one active resource set). For example, the NZP-CMR resource setting may be associated with an NZP-CMR resource set n−1, an NZP-CMR resource set n, and an NZP-CMR resource set n+1, and the NZP-CMR resource set n may be the active resource set. Similarly, the CSI-IM resource setting may be associated with a CSI-IM resource set m−1, a CSI-IM resource set m, and a CSI-IM resource set m+1, and the CSI-IM resource set m may be the active resource set. Similarly, the NZP-IMR resource setting may be associated with an NZP-IMR resource set s−1, an NZP-IMR resource set s, and an NZP-IMR resource set s+1, and the NZP-IMR resource set s may be the active resource set.

Further, each resource set may have one or more resources. For example, the NZP-CMR resource set n may include N resources including an NZP-CMR resource n1 and an NZP-CMR resource n2. In some aspects, the NZP-CMR resource n1 may be associated with a TCI state a (e.g., a first TCI state) and the NZP-CMR resource n2 may be associated with a TCI state b (e.g., a second TCI state). Similarly, the CSI-IM resource set m may include M resources including a CSI-IM resource m1 and a CSI-IM resource m2. Similarly, the NZP-IMR resource set s may include S resources including an NZP-IMR resource s1 and an NZP-IMR resource s2.

In some examples, the UE 115 may select one NZP-CMR resource out of the N NZP-CMR resources to use for reporting CSI. That is, the UE 115 may evaluate CSI corresponding to the M NZP-CMR resources and select one CMR resource out of M resources. In such examples, the UE 115 may report the selected CMR resource in a CSI-RS resource indicator (CRI) field as part of the CSI feedback such that a receiving TRP or a serving base station 105 may be able to identify a NZP-CMR resource to which the reported CSI corresponds. Based on the selected NZP-CMR resource, the UE 115 may also implicitly select a resource from the M resources including a CSI-IM resource m1 and a CSI-IM resource m2 and one or more resources from the S resources, including an NZP-IMR resource s1 and an NZP-IMR resource s2. In particular, an NZP-CMR resource may be associated with a CSI-IM resource. For instance, the NZP-CMR resource n1 may be associated with the CSI-IM resource m1 and the NZP-CMR resource n2 may be associated with the CSI-IM resource m2. Additionally, each NZP-CMR resource may be associated with all NZP-IMR resources collectively, such that the NZP-CMR resource n1 and the NZP-CMR resource n2 may both be associated with the NZP-IMR resource s1 and the NZP-IMR resource s2.

In the example described with reference to FIG. 2, the UE 115 may transmit a CSI report indicating the CRI corresponding to a TCI state for a TRP to use to transmit subsequent downlink transmissions to the UE 115. Uplink DCI may trigger the CSI report from the UE 115 on a PUSCH (e.g., an aperiodic CSI report or a semi-persistent CSI report). In another example, the UE 115 may perform measurements on the CSI-RSs without transmitting a report (e.g., for performing a beam refinement procedure). In yet another example, the reference signals may be TRSs rather than CSI-RSs, and the UE 115 may perform measurements on the TRSs without transmitting a report (e.g., to determine a timing or frequency offset based on the TRSs). In yet another example, the reference signals may be PRSs rather than CSI-RSs, and the UE 115 may perform measurements on the PRSs and report the measurements performed on the PRSs or report a position of the UE 115 computed based on the measurements.

In any of the examples described above, it may be appropriate for the UE 115 to identify a trigger state linked to a configuration for the UE 115 to use to receive and measure reference signal transmissions from a TRP. Although the examples described herein may relate to identifying a trigger state linked to a configuration for receiving and measuring CSI-RS transmissions, it is to be understood that the same techniques may be applied for identifying a trigger state linked to a configuration for receiving and measuring any reference signal transmissions.

In some examples, up to 128 trigger states may be RRC configured (e.g., using a higher layer parameter Aperiodic-TriggerStateList). Each trigger state in the list may be linked to one or more report settings (e.g., up to a maximum of 16). Each report setting may be linked through a CSI report configuration ID (e.g., CSI-ReportConfigId) in which one NZP CSI-RS resource set may be configured. The CSI-RS resource set may have multiple CSI-RS resources. The TCI state for each of the CSI-RS resources may be indicated as part of a trigger state configuration. If a CSI request field has N bits, a maximum of $2^{N-1}$ trigger states may be activated through a MAC control element (MAC-CE) (e.g., mapping to a maximum of 63 codepoints for N=6, where all zeros corresponds to no CSI report being triggered). The CSI request field of uplink DCI may indicate one trigger state.

Figure 3:
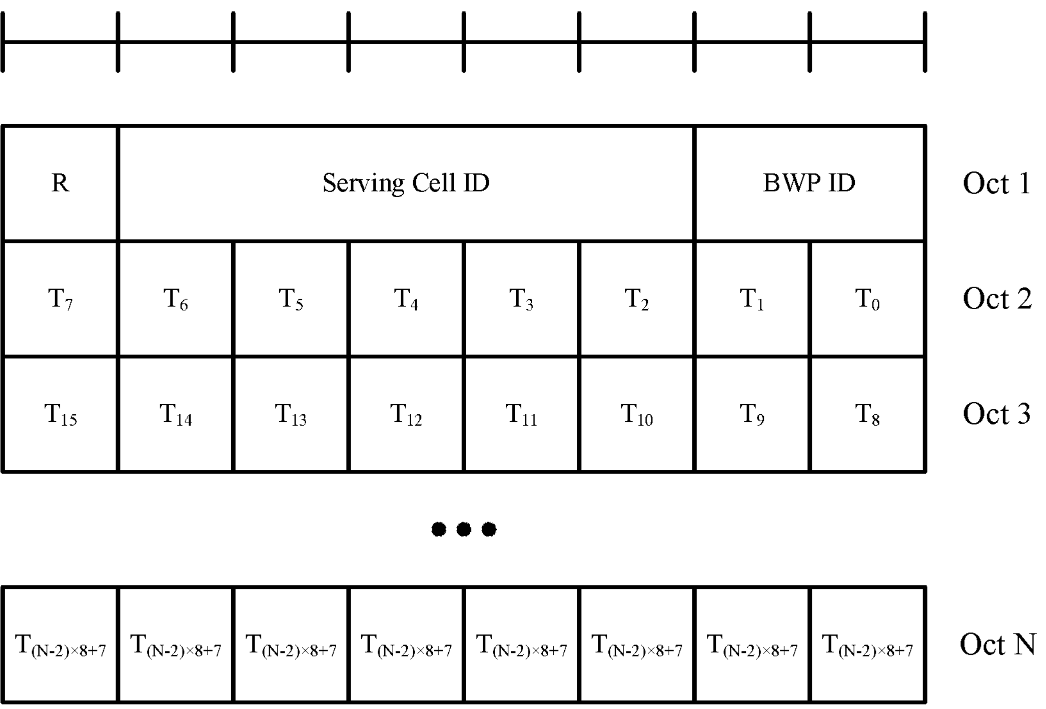
FIG. 3 illustrates an example of an aperiodic CSI trigger state sub-selection via a medium access control (MAC) control element (MAC-CE) in accordance with aspects of the present disclosure.

FIG. 3 illustrates an example of an aperiodic CSI trigger state sub-selection via a MAC-CE 300 in accordance with aspects of the present disclosure. In particular, the MAC-CE 300 may select a subset of trigger states (e.g., up to 63) from an RRC-configured trigger state list (e.g., which may be up to a size of 128). A codepoint to which an aperiodic trigger state is mapped may be determined by its ordinal position among all the aperiodic trigger states with Ti field set to one. For instance, a first aperiodic trigger state with Ti field set to one shall be mapped to the codepoint value one, a second aperiodic trigger state with Ti field set to one shall be mapped to the codepoint value two, and so on.

Figure 4:
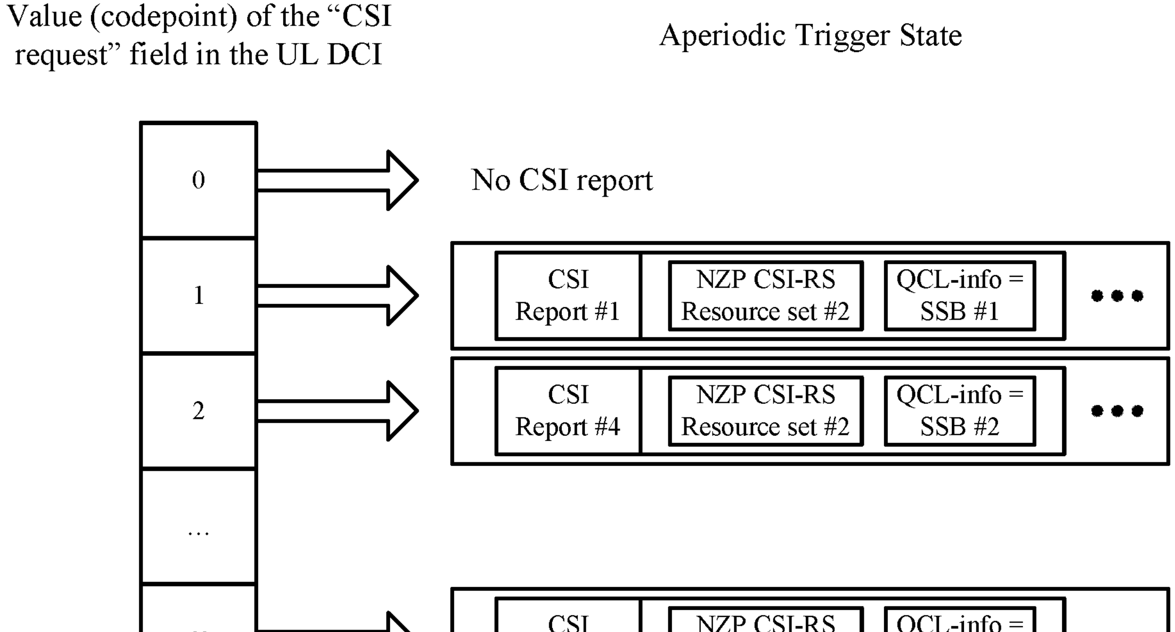
FIG. 4 illustrates an example of a mapping between a CSI request field in uplink downlink control information (DCI) and an aperiodic trigger state in accordance with aspects of the present disclosure.

FIG. 4 illustrates an example of a mapping 400 between a CSI request field in uplink DCI and an aperiodic trigger state in accordance with aspects of the present disclosure. A value of zero in the CSI request field may correspond to no CSI report. A value of one in the CSI request field may correspond to a first CSI report configuration linked to NZP CSI-RS resource set #2 with CSI-RSs quasi co-located (QCLed) with an SSB #1. A value of two in the CSI request field may correspond to a fourth CSI report configuration linked to NZP CSI-RS resource set #2 with CSI-RSs quasi co-located with an SSB #2. A value of 63 in the CSI request field may correspond to a seventh CSI report configuration linked to NZP CSI-RS resource #2 with CSI-RSs quasi co-located with an SSB #7.

Figure 5:
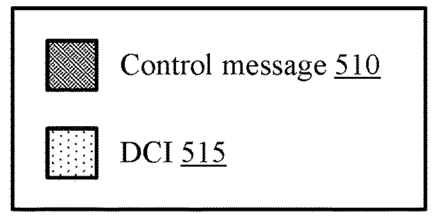
FIG. 5 illustrates an example of a wireless communications system that supports aperiodic reference signal measurements for multiple TRPs in accordance with aspects of the present disclosure.
Figure 5:
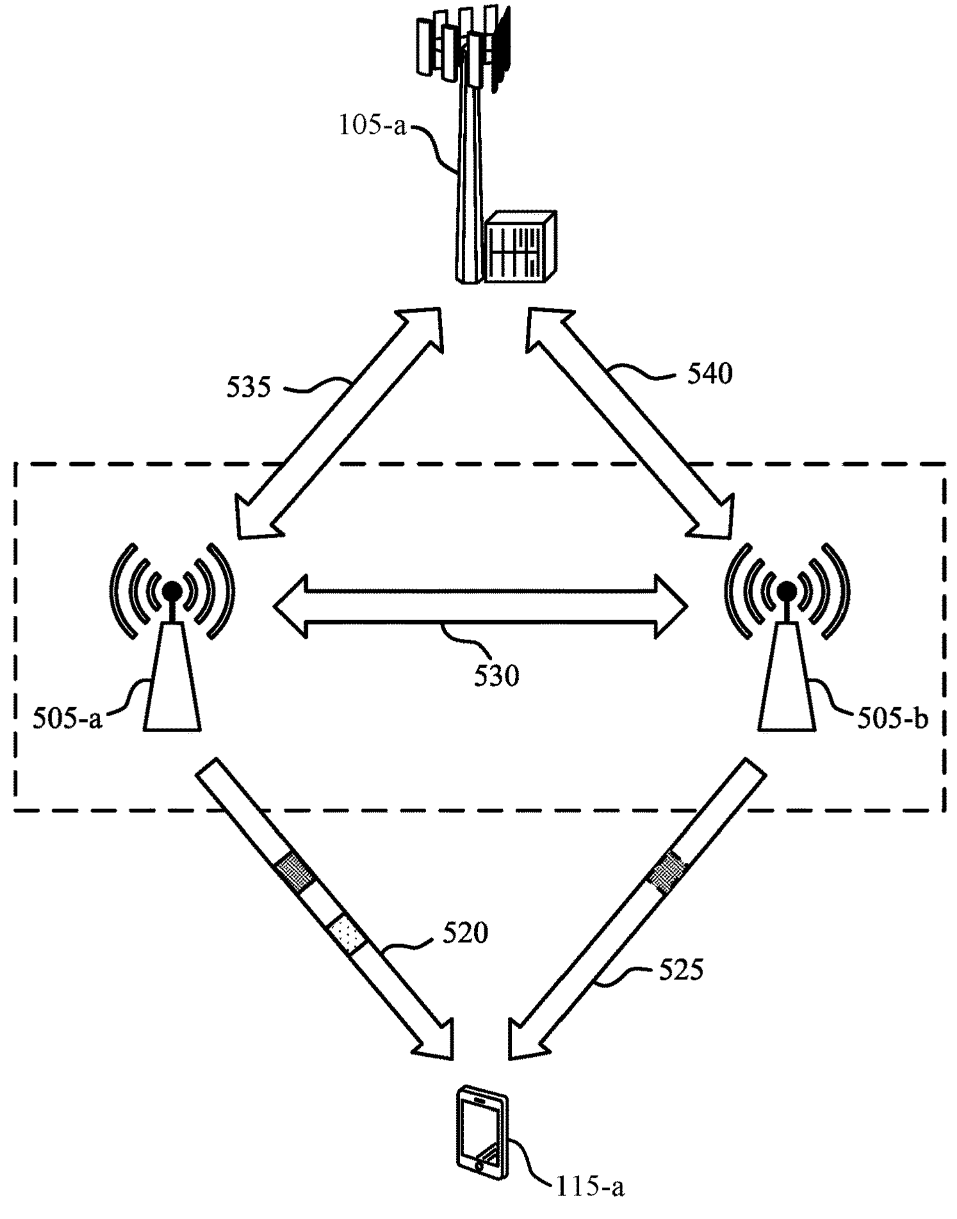

FIG. 5 illustrates an example of a wireless communications system 500 that supports aperiodic reference signal measurements for multiple TRPs in accordance with aspects of the present disclosure. The wireless communications system 500 includes a UE 115-*a*, which may be an example of a UE 115 described with reference to FIGS. 1-4. The wireless communications system also includes a TRP 505-*a* and a TRP 505-*b* (referred to collectively as TRPs 505), which may be examples of TRPs described with reference to FIGS. 1-4. The wireless communications system also includes a base station 105, which may be an example of a base station 105 described with reference to FIGS. 1-4. The wireless communications system 500 may implement aspects of wireless communications system 100. For example, the wireless communications system 500 may support efficient techniques for signaling a trigger state to the UE 115-*a* to allow the UE 115-*a* to identify a suitable configuration for receiving and measuring reference signals from a TRP 505.

The UE 115-*a*, TRP 505-*a*, TRP 505-*b*, and the base station 105-*a* may communicate with each other over one or more communication links. For instance, the base station 105-*a* may communicate with the TRP 505-*a* over a communication link 535, and the base station 105-*a* may communicate with the TRP 505-*b* over a communication link 540. The base station 105-*a* may transmit signals to the UE 115-*a* via a TRP 505, and the base station 105-*a* may receive signals from the UE 115-*a* via the TRP 505. The TRP 505-*a* and the TRP 505-*b* may communicate over a communication link 530 to coordinate communications with the UE 115-*a* (e.g., when appropriate). Further, the TRP 505-*a* may transmit downlink signals to the UE 115-*a* over a communication link 520, and the TRP 505-*b* may transmit downlink signals to the UE 115-*a* over a communication link 525. Although FIG. 5 illustrates that the TRP 505-*a* and the TRP 505-*b* are connected to a single base station 105-*a*, it is to be understood that the techniques described herein may apply even if the TRP 505-*a* and the TRP 505-*b* are connected to different base stations 105.

In some aspects, it may be appropriate for the UE 115-*a* to perform measurements on reference signals received from the TRP 505-*a* and the TRP 505-*b* in order to identify suitable configurations for communicating with the TRP 505-*a* and the TRP 505-*b*. There may be multiple configurations for receiving and performing measurements on reference signals from a TRP 505, and one or more of these configurations may be linked to each of a number of trigger states. Accordingly, the base station 105-*a* may signal a trigger state to the UE 115-*a* in DCI, and the UE 115-*a* may use one of the configurations linked to the trigger state to receive and perform measurements on reference signals from the base station 105-*a*. In some cases, however, if the UE 115-*a* supports communications with multiple TRPs (e.g., as shown in FIG. 5), the overhead of signaling a trigger state in DCI may be high. For instance, the DCI may indicate a trigger state from a list of trigger states supported by all of the multiple TRPs rather than a list of trigger states supported by the TRP transmitting the DCI. As a result, a large number of bits in the DCI may be used to indicate the trigger state, and the DCI may be underutilized.

Wireless communications system 500 may support efficient techniques to allow the UE 115-*a* to identify a trigger state with limited overhead. The UE 115-*a* may receive an indication of different lists of trigger states associated with the different TRPs 505, and, when the UE 115-*a* receives DCI 515 indicating a trigger state index, the UE 115-*a* may reference an appropriate list to identify the trigger state corresponding to the trigger state index. In particular, the UE 115-*a* may determine a CORESET pool index of a CORESET in which the DCI 515 is received, and the UE 115-*a* may identify the trigger state corresponding to the trigger state index from a list of trigger states associated with the CORESET pool index. Because different TRPs 505 may transmit DCI in CORESETs associated with different CORESET pool indices, the UE 115-*a* may be able to differentiate between DCI from different TRPs 505, and the UE 115-*a* may be able to identify a trigger state indicated by a TRP 505 from a list of trigger states configured for that TRP 505.

Thus, the interpretation of a CSI request field in uplink DCI 515 may be a function of a CORESET pool index of a CORESET in which the DCI 515 is detected (i.e., a function of the TRP that transmits the DCI 515). The base station 105-*a* may indicate to the UE 115-*a* two lists of trigger states associated with two values of a CORESET pool index (e.g., associated with the two TRPs 505). Accordingly, when the UE 115-*a* receives uplink DCI 515 from a TRP 505 (e.g., scheduling a PUSCH transmission), the UE 115-*a* may determine whether the CORESET pool index of the CORESET in which the uplink DCI 515 is received is zero or one. If the DCI 515 is detected in a CORESET with a CORESET pool index value of zero (e.g., corresponding to the TRP 505-*a*), the CSI field of the DCI 515 may indicate a trigger state from the first list. Alternatively, if the DCI 515 is detected in a CORESET with a CORESET pool index value of one (e.g., corresponding to the TRP 505-*b*), the CSI field of the DCI 515 may indicate a trigger state from the second list.

Figure 6:
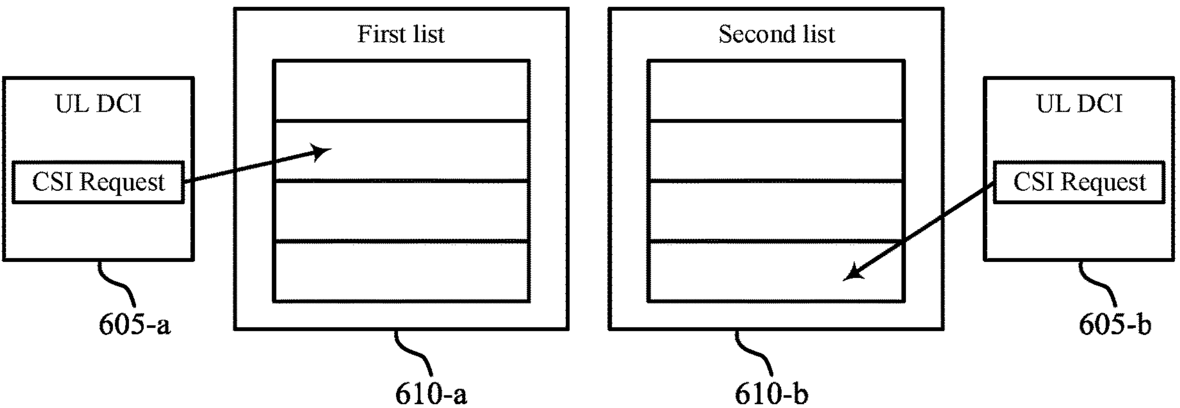
FIG. 6 illustrates an example of lists of trigger states in accordance with aspects of the present disclosure.

FIG. 6 illustrates an example of lists of trigger states 600 in accordance with aspects of the present disclosure. In the example of FIG. 6, if the UE 115 detects a CSI request in uplink DCI 605-*a* in a CORESET with a CORESET pool index value of zero, the UE 115 may reference a first list 610-*a* to identify a trigger state. In particular, the UE 115 may determine that the first list 610-*a* is associated with the CORESET pool index value of zero, and the UE 115 may identify a trigger state corresponding to a trigger state index in the CSI request in the first list 610-*a* based on detecting the CSI request in the uplink DCI 605-*a* in the CORESET with the CORESET pool index value of zero. Alternatively, if the UE 115 detects a CSI request in the uplink DCI 605-*b* in a CORESET with a CORESET pool index value of one, the UE 115 may reference a second list 610-*b* to identify a trigger state. In particular, the UE 115 may determine that the second list 610-*b* is associated with the CORESET pool index value of one, and the UE 115 may identify a trigger state corresponding to a trigger state index in the CSI request in the second list 610-*b* based on detecting the CSI request in uplink DCI 605-*b* in the CORESET with the CORESET pool index value of one.

In some aspects, two control messages (e.g., MAC-CEs) may be used for sub-selection (e.g., to sub-select two lists). For instance, turning back to FIG. 5, the TRP 505-*a* may transmit a first control message 510 over a communication link 520 to the UE 115 indicating a first list of trigger states, and the TRP 505-*b* may transmit a second control message 510 over a communication link 525 to the UE 115 indicating a second list of trigger states. In some cases, each control message 510 may include a field that identifies whether the control message 510 corresponds to a CORESET pool index value of zero or one. In such cases, the field may be a reserved bit (R) in a MAC-CE as shown in FIG. 3. In other cases, a CORESET pool index associated with a PDSCH that carries a control message 510 (e.g., or the CORESET pool index associated with the PDCCH that scheduled the PDSCH that carries the control message 510) may be used to identify that the control message 510 corresponds to the CORESET pool index. In such cases, the UE 115 may identify a CORESET pool index of a CORESET that includes a PDCCH used to schedule a PDSCH, and the UE 115 may determine that the control message 510 in the PDSCH is associated with the CORESET pool index because the PDSCH is scheduled by the PDCCH in the CORESET with the CORESET pool index.

If the UE 115 is configured to determine a CORESET pool index to which a control message 510 corresponds based on the PDSCH in which the control message 510 is received, and a retransmission of the PDSCH is scheduled (e.g., if the initial transmissions of the PDSCH that carries the control message 510 fails), the PDSCH corresponding to the retransmission may be associated with a different CORESET pool index value (e.g., transmitted by another TRP). Accordingly, the CORESET pool index associated with the first PDSCH (e.g., initial transmission) may be used for the purpose of determining the association of the control message 510 to the CORESET pool index. For instance, the UE 115 may determine a CORESET pool index associated with an initial PDSCH, and, after receiving a second PDSCH, the UE 115 may determine that a list of trigger states in the second PDSCH is associated with the CORESET pool index associated with the initial PDSCH (e.g., regardless of the CORESET pool index associated with the second PDSCH).

In other aspects, a single control message (e.g., MAC-CE) may be used for sub-selection (e.g., to sub-select two lists). For instance, the TRP 505-*a* may transmit a first control message 510 over a communication link 520 to the UE 115 indicating a first list of trigger states and a second list of trigger states. In such aspects, different fields of the control message 510 (e.g., MAC-CE) may be associated with different CORESET pool index values. For instance, a first field in the control message 510 indicating a first list of trigger states may include an indication that the first field is associated with a first CORESET pool index, and a second field in the control message 510 indicating a second list of trigger states may include an indication that the second field is associated with a second CORESET pool index.

In the aspects described above, the first and second lists of trigger states may be configured from one or more sets or lists of RRC configured trigger states.

In one example, two RRC configured sets (e.g., two CSI aperiodic trigger state lists) may be associated with two CORESET pool index values. In this example, the base station 105-*a* may transmit, and the UE 115-*a* may receive, RRC signaling indicating a first set of one or more trigger states corresponding to a first CORESET pool index and a second set of one or more trigger states corresponding to a second CORESET pool index. Thus, if a control message 510 is associated with a CORESET pool index value or a field of the control message 510 is associated with the CORESET pool index value, sub-selection may be from the corresponding RRC-configured list associated with the same CORESET pool index value. In particular, a first control message corresponding to a first CORESET pool index is used to sub-select a first list of trigger states from the first set of one or more trigger states, and a second control message corresponding to a second CORESET pool index is used to sub-select a second list of trigger states from the second set of one or more trigger states.

In another example, a same RRC configured list (e.g., one CSI aperiodic trigger state list) may be associated with two CORESET pool index values. In this example, the base station 105-*a* may transmit, and the UE 115-*a* may receive, RRC signaling indicating a single set of one or more trigger states corresponding to a first CORESET pool index and a second CORESET pool index. Thus, regardless of a CORE- SET pool index value associated with a control message 510 or a field of the control message 510, sub-selection may be from the same RRC-configured list. In particular, a first control message corresponding to a first CORESET pool index is used to sub-select a first list of trigger states from the single set of one or more trigger states, and a second control message corresponding to a second CORESET pool index is used to sub-select a second list of trigger states from the single set of one or more trigger states.

Once the UE 115-*a* identifies a first list of trigger states associated with a first CORESET pool index and a second list of trigger states associated with the second list of trigger states, the UE 115-*a* may receive DCI 515 indicating a trigger state linked to a configuration for receiving and measuring reference signals from a TRP 505. For instance, the TRP 505-*a* may transmit, and the UE 115-*a* may receive, DCI 515 including a trigger state index. The UE 115-*a* may determine a CORESET pool index of a CORESET in which the DCI 515 is received, and the UE 115-*a* may identify a trigger state in a list of trigger states associated with a same CORESET pool index as the CORESET pool index of the CORESET in which the DCI 515 is received. The UE 115-*a* may then identify a configuration linked to the identified trigger state, and the UE 115-*a* may use the configuration to receive and measure reference signals from the TRP 505-*a*.

The TRP 505-*a* may transmit CSI-RS, SSB, TRS, or PRS transmissions on corresponding resources, and the UE 115-*a* may receive and measure the CSI-RS, SSB, TRS, or PRS transmissions. If a report quantity is configured in the DCI 515 (e.g., corresponding to CSI report configurations associated with the identified trigger state), the UE 115-*a* may transmit PUSCH and multiplex one or more CSI reports associated with the identified trigger state. The report quantity may indicate a type of report or different types of reports (e.g., reference signal received power (RSRP), channel quality information (CQI), precoding matrix indicator (PMI), rank indication (RI), etc.) for the UE 115-*a* to transmit to the TRP 505-*a*. As an example, the report quantity parameter in the DCI 515 may be set to 'none,' 'cri-RI-PMI-CQI,' 'cri-RI-i1,' 'cri-RI-i1-CQI,' 'cri-RI-CQI,' 'cri-RSRP,' 'cri-SINR,' 'ssb-Index-RSRP,' 'ssb-Index-SINR' or 'cri-RI-LI-PMI-CQI.'

If the UE 115-*a* receives CSI-RS transmissions, the UE 115-*a* may transmit a report of the measurements performed on the CSI-RS transmissions to the TRP 505-*a*, or the UE 115-*a* may use the measurements performed on the CSI-RS transmissions to perform beam refinement. If the UE 115-*a* receives SSB transmissions, the UE 115-*a* may transmit a report of the measurements performed on the SSB transmissions to the TRP 505-*a*, or the UE 115-*a* may use the measurements performed on the CSI-RS transmissions to perform beam management. If the UE 115-*a* receives TRS transmissions, the UE 115-*a* may use measurements performed on the TRSs to determine a timing or frequency offset for communications with the TRP 505-*a*. If the UE 115-*a* receives PRSs, the UE 115-*a* may transmit a report (e.g., positioning report) of the measurements performed on the PRS transmissions to the TRP 505-*a* (e.g., UE-assisted positioning), or the UE 115-*a* may transmit a report indicating a position of the UE 115-*a* computed based on the measurements performed on the PRS transmissions to the TRP 505-*a* (e.g., UE-based positioning). The positioning report may be a layer one (L1), layer two (L2), or layer three (L3) report, and the UE 115-*a* may transmit the positioning report on the PUSCH scheduled by the DCI 515 carrying a reference signal trigger (e.g., CSI trigger).

The TRP 505-*a* may transmit the DCI 515 to trigger reference signal measurements by the UE 115-*a*. There may be multiple options for DCI-based triggering of reference signal measurements (e.g., CSI-RS or PRS). For instance, DCI may include a reference signal request field (e.g., CSI request field) triggering reference signal measurements. Alternatively, a DCI format may be defined for triggering reference signal measurements (e.g., instead of using a CSI request field in uplink DCI). If the DCI format is defined for triggering reference signal measurements, the interpretation of one or more fields in DCI with the DCI format (e.g., group-common DCI) may be based on a CORESET pool index of a CORESET in which the DCI is detected (e.g., fields in the DCI may point to elements from one of two lists depending on the CORESET pool index value as described herein).

Figure 7:
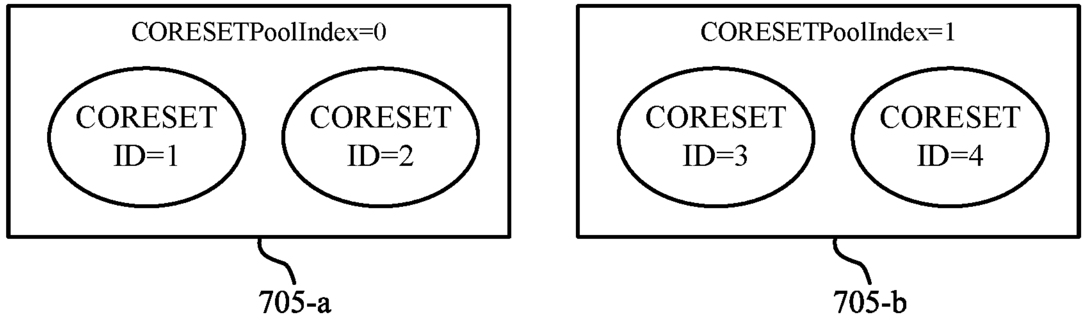
FIG. 7 illustrates an example of CORESET pool indices in accordance with aspects of the present disclosure.

FIG. 7 illustrates an example of CORESET pool indices 700 in accordance with aspects of the present disclosure. The wireless communications system 500 may use multiple CORESET pool indices to support a multi-DCI based design for multi-TRP transmissions. As an example, a first DCI (e.g., transmitted from TRP 505-*a*) may schedule a first PUSCH (e.g., to be transmitted to TRP 505-*a*), and a second DCI (e.g., transmitted from TRP 505-*b*) may schedule a second PUSCH (e.g., to be transmitted to TRP 505-*b*). Thus, in the multi-DCI based design for multi-TRP transmission, the TRP differentiation at the UE side may be based on the CORESET pool indices of the CORESETs that include the DCI. Each CORESET (e.g., a maximum of five CORESETs) may be configured with a value of a CORESET pool index. In some examples, the value of the CORESET pool index may be zero or one, and the CORESET pool indices may group the CORESETs into two groups. The UE 115-*a* may determine if an uplink grant (e.g., DCI) is associated with a CORESET pool index value of zero or one based on the CORESET pool index value of the CORESET in which the uplink grant is received. Without the use of CORESET pool indices, different TRPs 505 may be transparent to the UE 115-*a*.

The TRP 505-*a* may be configured to transmit DCI in CORESETs with a first CORESET pool index 705-*a* (e.g., CORESET pool index zero), and the TRP 505-*b* may be configured to transmit DCI in CORESETs with a second CORESET pool index 705-*b* (e.g., CORESET pool index one). Multiple CORESETs may have a same CORESET pool index. For instance, a first CORESET with a CORESET ID of one and a second CORESET with a CORESET ID of two may have the first CORESET pool index 705-*a*. Further, a third CORESET with a CORESET ID of three and a fourth CORESET with a CORESET ID of four may have the second CORESET pool index 705-*b*. In some cases, the base station 105-*a* may determine whether the UE 115-*a* is configured to support multi-DCI based multi-TRP before scheduling communications between the UE 115-*a* and multiple TRPs 505. The UE 115-*a* may be configured to differentiate between DCI from different TRPs 505 if the UE 115-*a* is configured by a higher-layer parameter (e.g., PDCCH-Config) that contains two different values of CORESETPoolIndex in CORESETs for an active bandwidth part of a serving cell.

Figure 8:
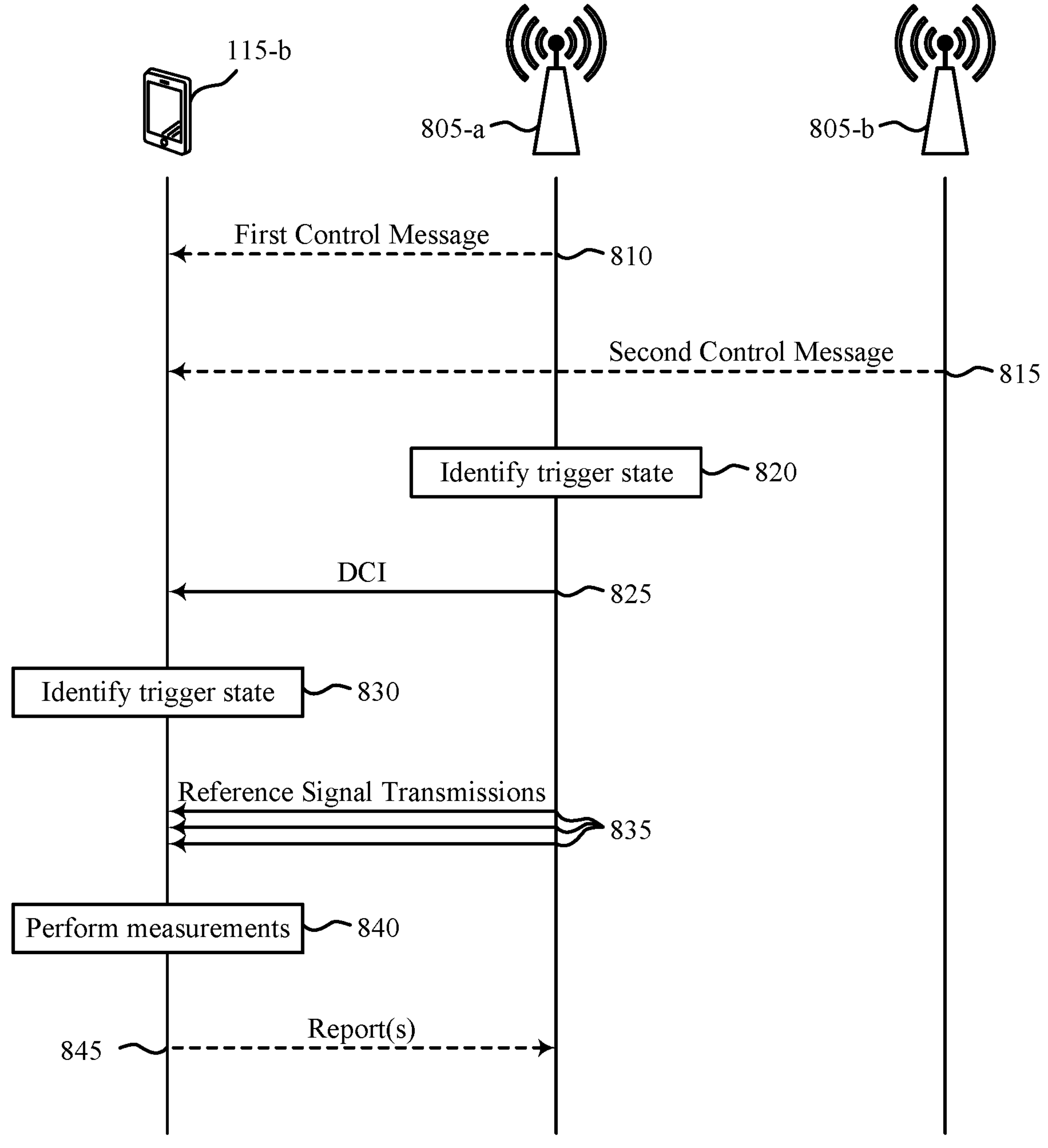
FIG. 8 illustrates an example of a process flow that supports aperiodic reference signal measurements for multiple TRPs in accordance with aspects of the present disclosure.

FIG. 8 illustrates an example of a process flow 800 that supports aperiodic reference signal measurements for multiple TRPs in accordance with aspects of the present disclosure. Process flow 800 illustrates aspects of techniques performed by a UE 115-*b*, which may be an example of a UE 115 described with reference to FIGS. 1-7. Process flow 800 also illustrates aspects of techniques performed by a TRP

805-*a* and a TRP 805-*b*, which may be examples of TRPs described with reference to FIGS. 1-7. Process flow 800 may implement aspects of the trigger states 600 shown in FIG. 6. For example, the process flow 800 may support efficient techniques to allow the UE 115-*b* to identify a trigger state with limited overhead.

In the following description of process flow 800, the messages or signals exchanged between the UE 115-*b*, TRP 805-*a*, and TRP 805-*b* may be transmitted in a different order than the example order shown, or the operations performed by the UE 115-*b*, TRP 805-*a*, and TRP 805-*b* may be performed in different orders or at different times. Some operations may also be omitted from process flow 800, and other operations may be added to process flow 800. The TRP 805-*a* and the TRP 805-*b* may be connected to a same base station 105 or different base stations 105. Further, the operations performed by the TRP 805-*a* and TRP 805-*b* may collectively be performed by a network in which the TRP 805-*a* and the TRP 805-*b* operates.

In one aspect, at 810, the TRP 805-*a* may transmit, and the UE 115 may receive, a first control message indicating a first list of trigger states associated with a first CORESET pool index, and, at 815, the TRP 805-*b* may transmit, and the UE 115-*b* may receive, a second control message indicating the second list of trigger states associated with the second CORESET pool index. In this aspect, a field in the first control message may indicate that the first control message corresponds to the first CORESET pool index or a data channel in which the first control message is received may be associated with the first CORESET pool index. In another aspect, at 810, the TRP 805-*a* may transmit, and the UE 115-*b* may receive, a single control message including a first field indicating the first list of trigger states associated with the first CORESET pool index and a second field indicating the second list of trigger states associated with the second CORESET pool index. In this aspect, the first field indicating the first list of trigger states may be associated with the first CORESET pool index, and the second field indicating the second list of trigger states may be associated with the second CORESET pool index.

At 820, the TRP 805-*a* may identify a trigger state in the first list of trigger states linked to a configuration for the UE 115-*b* to use to receive one or more reference signal transmissions. At 825, the TRP 805-*a* may transmit, and the UE 115-*b* may receive, DCI (e.g., UE-specific or group-common DCI) including a trigger state index corresponding to the identified trigger state in a CORESET having the first CORESET pool index. At 830, the UE 115-*b* may identify the trigger state corresponding to the trigger state index in the first list of trigger states based on the CORESET having the first CORESET pool index. At 835, the UE 115-*b* may receive one or more reference signal transmissions based on a configuration linked to the identified trigger state. For instance, the UE 115-*b* may select the configuration based on the identified trigger state, and the UE 115-*b* may receive the one or more reference signal transmissions on resources linked to the selected configuration. The one or more reference signal transmissions may be CSI-RS transmissions, SSB transmissions, TRS transmissions, or PRS transmissions.

At 840, the UE 115-*b* may perform measurements on the one or more reference signal transmissions based at least in part on receiving the one or more reference signal transmissions. In some cases, the UE 115-*b* may receive, in the DCI, an indication that the UE 115-*b* is to transmit at least one report, and, at 845, the UE 115-*b* may transmit the at least one report based on the received one or more reference signal transmissions and the indication that the UE 115-*b* is to transmit the at least one report. For instance, the UE 115-*b* may transmit reports indicating the measurements performed on the one or more reference signal transmissions. In some examples, the reference signal transmissions may be PRS transmissions, and the UE 115-*b* may perform measurements on the PRS transmissions. The UE 115-*b* may then transmit at least one report indicating the measurements performed on the PRS transmissions. Alternatively, the UE 115-*b* may compute a position of the UE 115-*b* based on the measurements and transmit at least one report indicating the position of the UE 115-*b*.

In some aspects, a base station 105 connected to the TRP 805-*a*, the TRP 805-*b*, or both may transmit, and the UE 115-*b* may receive, RRC signaling indicating a first set of one or more trigger states and a second set of one or more trigger states. In such aspects, the first list of trigger states associated with the first CORESET pool index may be sub-selected from the first set of one or more trigger states, and the second list of trigger states associated with the second CORESET pool index may be sub-selected from the second set of one or more trigger states. In other aspects, a base station 105 connected to the TRP 805-*a*, the TRP 805-*b*, or both may transmit, and the UE 115-*b* may receive, RRC signaling indicating a single set of one or more trigger states. In such aspects, the first list of trigger states associated with the first CORESET pool index and the second list of trigger states associated with the second CORESET pool index may each be sub-selected from the single set of one or more trigger states.

Figure 9:
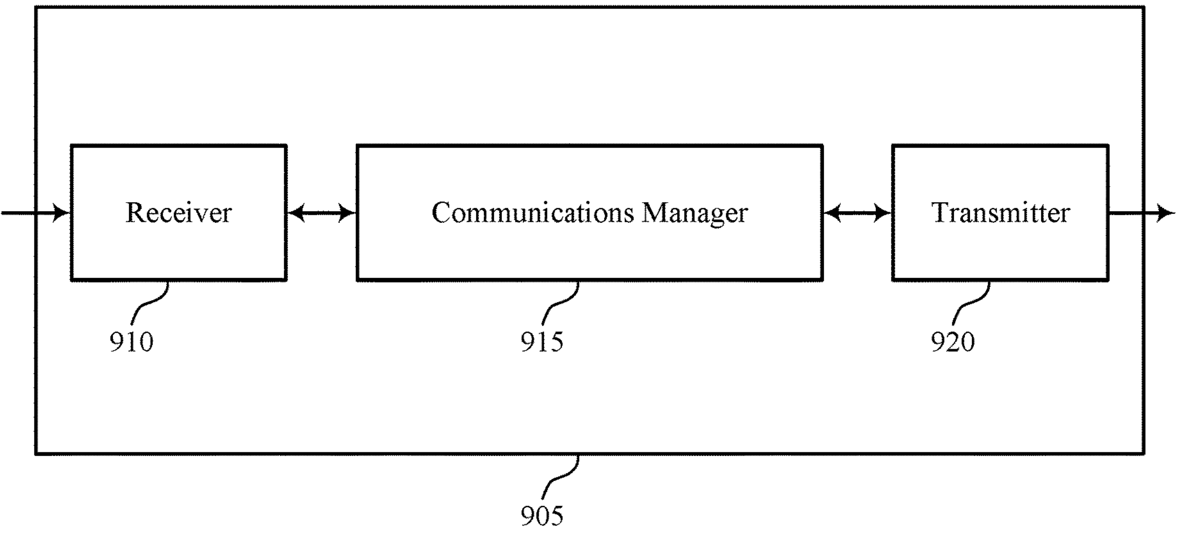
FIGS. 9 and 10 show block diagrams of devices that support aperiodic reference signal measurements for multiple TRPs in accordance with aspects of the present disclosure.

FIG. 9 shows a block diagram 900 of a device 905 that supports aperiodic reference signal measurements for multiple TRPs in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to aperiodic reference signal measurements for multiple TRPs, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be implemented as an integrated circuit or chipset for the device 905, and the receiver 910 and the transmitter 920 may be implemented as analog components (for example, amplifiers, filters, antennas) coupled with the device 905 modem to enable wireless transmission and reception. The actions performed by the communications manager 915 as described herein may be implemented to realize one or more potential advantages. At least one implementation may enable the communications manager 915 to identify a trigger state linked to a configuration for receiving and measuring reference signals from a TRP with limited overhead.

For example, the communications manager 915 may receive one or more control messages indicating a first list of trigger states associated with a first control resource set pool index and a second list of trigger states associated with a second control resource set pool index, receive downlink control information including a trigger state index in a control resource set having the first control resource set pool index, identify a trigger state corresponding to the trigger state index in the first list of trigger states based on the control resource set having the first control resource set pool index, and receive one or more reference signal transmissions based on a configuration linked to the identified trigger state. By identifying the trigger state in the first list of trigger states based on the control resource set having the first control resource set pool index, one or more processors of the device 905 (e.g., processor(s) controlling or incorporated with the communications manager 915) may experience power savings (e.g., increased battery life) since, for example, the UE may identify the trigger state with limited overhead, and the UE may search through a list of trigger states for a specific TRP rather than a list of trigger states for all TRPs to identify the trigger state.

The communications manager 915 may be an example of aspects of the communications manager 1210 described herein. The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
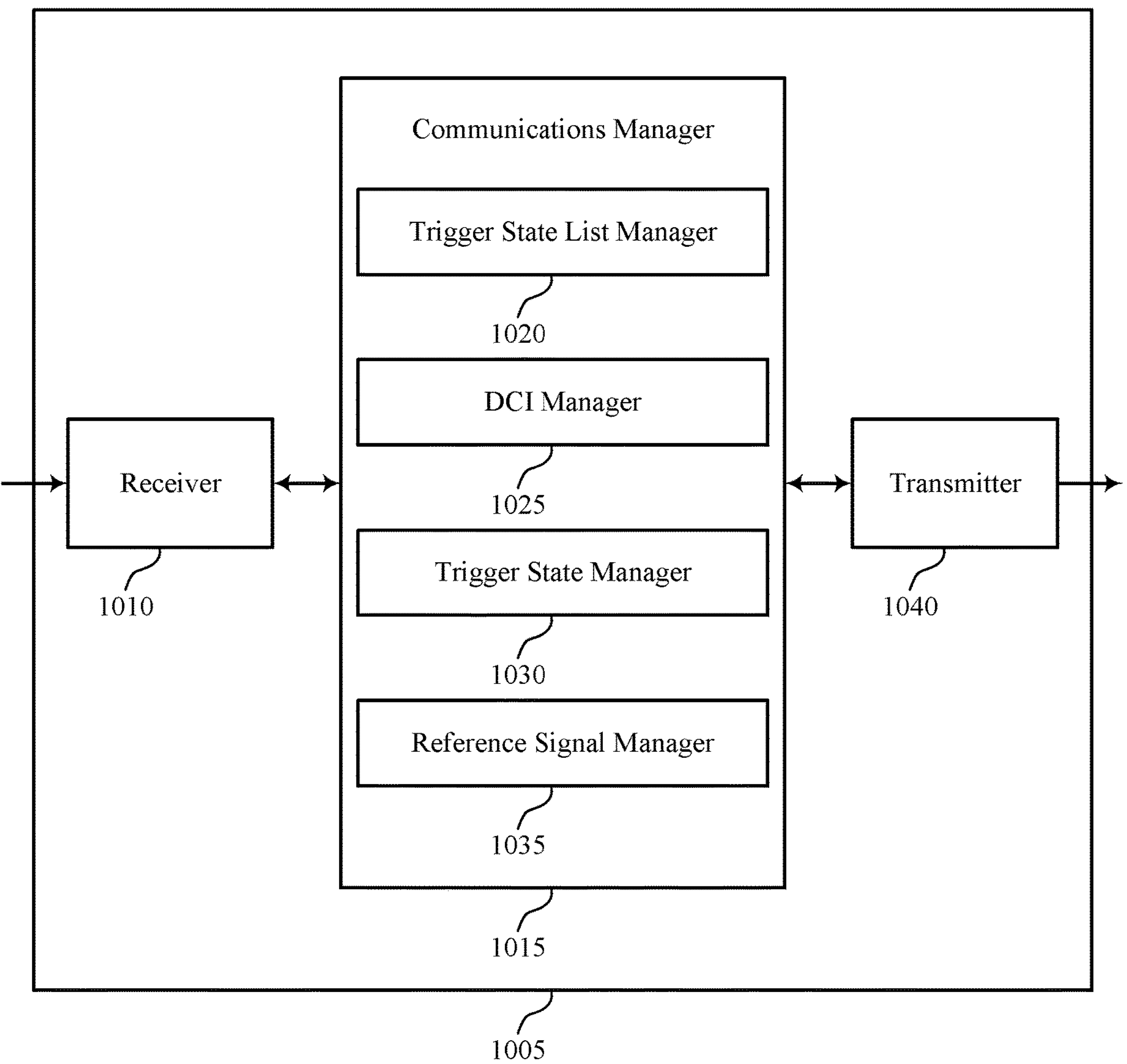

FIG. 10 shows a block diagram 1000 of a device 1005 that supports aperiodic reference signal measurements for multiple TRPs in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to aperiodic reference signal measurements for multiple TRPs, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a trigger state list manager 1020, a DCI manager 1025, a trigger state manager 1030, and a reference signal manager 1035. The communications manager 1015 may be an example of aspects of the communications manager 1210 described herein.

The trigger state list manager 1020 may receive one or more control messages indicating a first list of trigger states associated with a first control resource set pool index and a second list of trigger states associated with a second control resource set pool index. The DCI manager 1025 may receive downlink control information including a trigger state index in a control resource set having the first control resource set pool index. The trigger state manager 1030 may identify a trigger state corresponding to the trigger state index in the first list of trigger states based on the control resource set having the first control resource set pool index. The reference signal manager 1035 may receive one or more reference signal transmissions based on a configuration linked to the identified trigger state.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
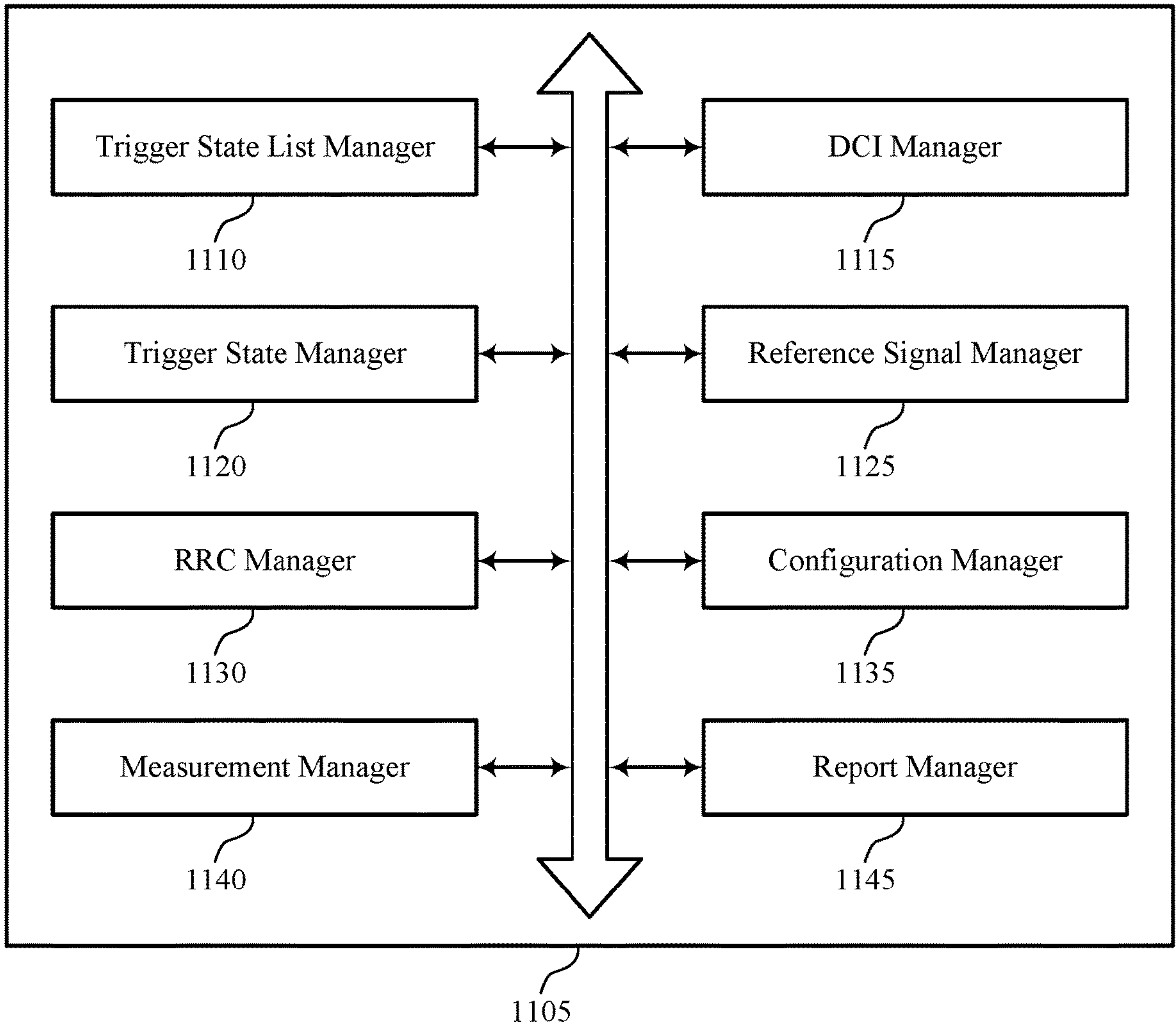
FIG. 11 shows a block diagram of a communications manager that supports aperiodic reference signal measurements for multiple TRPs in accordance with aspects of the present disclosure.

FIG. 11 shows a block diagram 1100 of a communications manager 1105 that supports aperiodic reference signal measurements for multiple TRPs in accordance with aspects of the present disclosure. The communications manager 1105 may be an example of aspects of a communications manager 915, a communications manager 1015, or a communications manager 1210 described herein. The communications manager 1105 may include a trigger state list manager 1110, a DCI manager 1115, a trigger state manager 1120, a reference signal manager 1125, a RRC manager 1130, a configuration manager 1135, a measurement manager 1140, and a report manager 1145. Each of these modules may communicate, directly or indirectly, with one another (e.g., via one or more buses).

The trigger state list manager 1110 may receive one or more control messages indicating a first list of trigger states associated with a first control resource set pool index and a second list of trigger states associated with a second control resource set pool index. The DCI manager 1115 may receive downlink control information including a trigger state index in a control resource set having the first control resource set pool index. The trigger state manager 1120 may identify a trigger state corresponding to the trigger state index in the first list of trigger states based on the control resource set having the first control resource set pool index. The reference signal manager 1125 may receive one or more reference signal transmissions based on a configuration linked to the identified trigger state.

In some examples, the trigger state list manager 1110 may receive a first control message indicating the first list of trigger states associated with the first control resource set pool index. In some examples, the trigger state list manager 1110 may receive a second control message indicating the second list of trigger states associated with the second control resource set pool index. In some cases, a field in the first control message indicates that the first control message corresponds to the first control resource set pool index, and where identifying the trigger state in the first list of trigger states is based on the field in the first control message indicating that the first control message corresponds to the first control resource set pool index. In some cases, a data channel in which the first control message is received is associated with the first control resource set pool index, and where identifying the trigger state in the first list of trigger states is based on the data channel being associated with the first control resource set pool index.

In some examples, the trigger state list manager 1110 may receive a single control message including a first field indicating the first list of trigger states associated with the first control resource set pool index and a second field indicating the second list of trigger states associated with the second control resource set pool index. In some cases, the first field indicating the first list of trigger states is associated with the first control resource set pool index, and where identifying the trigger state in the first list of trigger states is based on the first field being associated with the first control resource set pool index.

The RRC manager 1130 may receive radio resource control signaling indicating a first set of one or more trigger states and a second set of one or more trigger states, where the first list of trigger states is sub-selected from the first set of one or more trigger states and the second list of trigger states is sub-selected from the second set of one or more trigger states. In some examples, the RRC manager 1130 may receive radio resource control signaling indicating a single set of one or more trigger states, where the first list of trigger states and the second list of trigger states are each sub-selected from the single set of one or more trigger states. In some cases, the one or more control messages include MAC-CEs.

The configuration manager 1135 may select the configuration for receiving the one or more reference signal transmissions based on the identified trigger state. In some examples, the reference signal manager 1125 may receive the one or more reference signal transmissions on resources linked to the selected configuration. The measurement manager 1140 may perform measurements on the one or more reference signal transmissions based on receiving the one or more reference signal transmissions. In some cases, the one or more reference signal transmissions include CSI-RS transmissions, SSB transmissions, TRS transmissions, or PRS transmissions. The report manager 1145 may receive, in the downlink control information, an indication that the UE is to transmit at least one report. In some examples, the report manager 1145 may transmit the at least one report based on the received one or more reference signal transmissions and the indication that the UE is to transmit the at least one report. In some cases, the downlink control information includes group-common downlink control information.

In some examples, the measurement manager 1140 may perform measurements on the PRS transmissions. In some examples, the report manager 1145 may transmit at least one report indicating the measurements performed on the positioning reference signal transmissions. In some examples, the measurement manager 1140 may perform measurements on the PRS transmissions. In some examples, the measurement manager 1140 may compute a position of the UE based on the measurements. In some examples, the report manager 1145 may transmit at least one report indicating the position of the UE.

Figure 12:
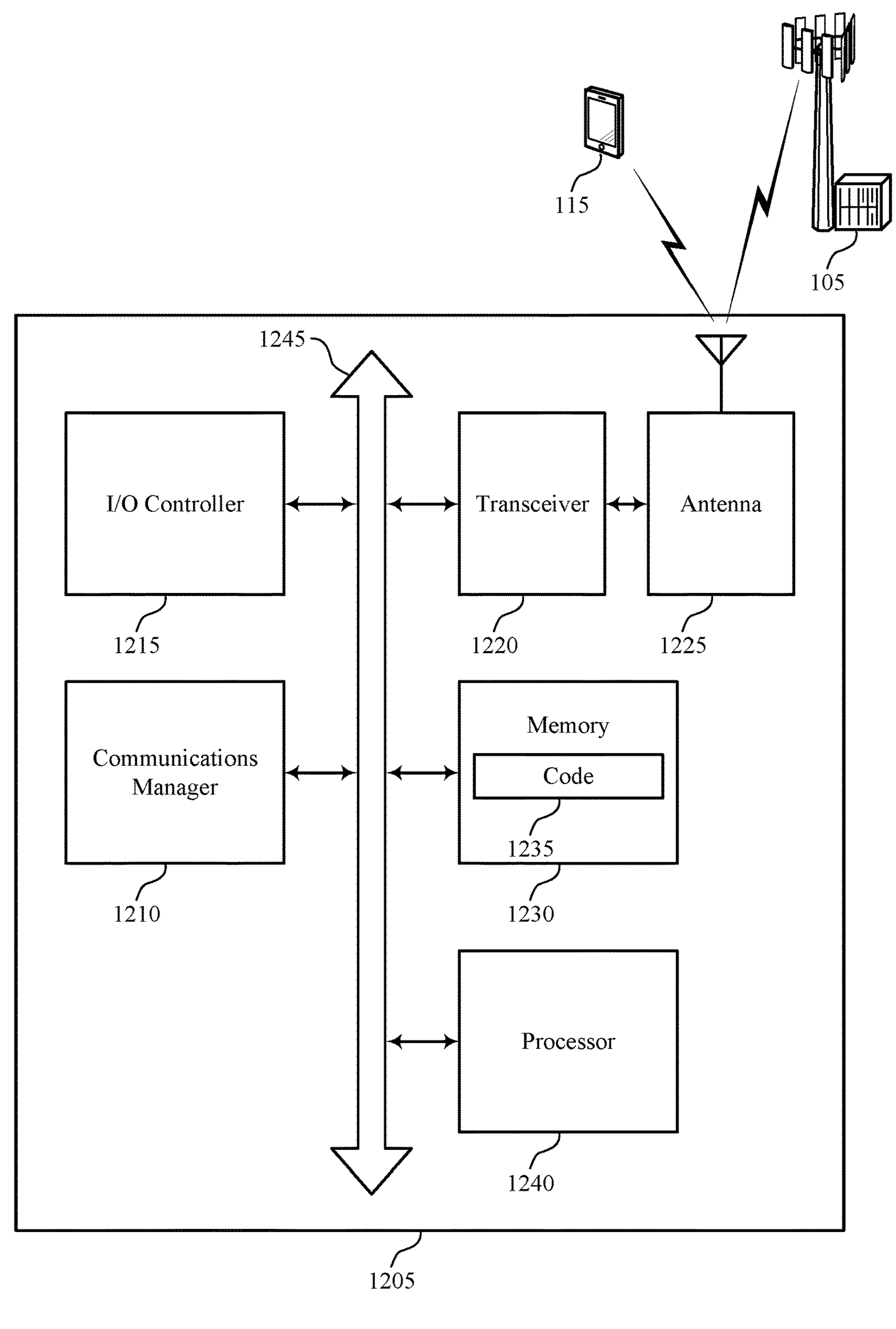
FIG. 12 shows a diagram of a system including a device that supports aperiodic reference signal measurements for multiple TRPs in accordance with aspects of the present disclosure.

FIG. 12 shows a diagram of a system 1200 including a device 1205 that supports aperiodic reference signal measurements for multiple TRPs in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive one or more control messages indicating a first list of trigger states associated with a first control resource set pool index and a second list of trigger states associated with a second control resource set pool index, receive downlink control information including a trigger state index in a control resource set having the first control resource set pool index, identify a trigger state corresponding to the trigger state index in the first list of trigger states based on the control resource set having the first control resource set pool index, and receive one or more reference signal transmissions based on a configuration linked to the identified trigger state.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting aperiodic reference signal measurements for multiple TRPs).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
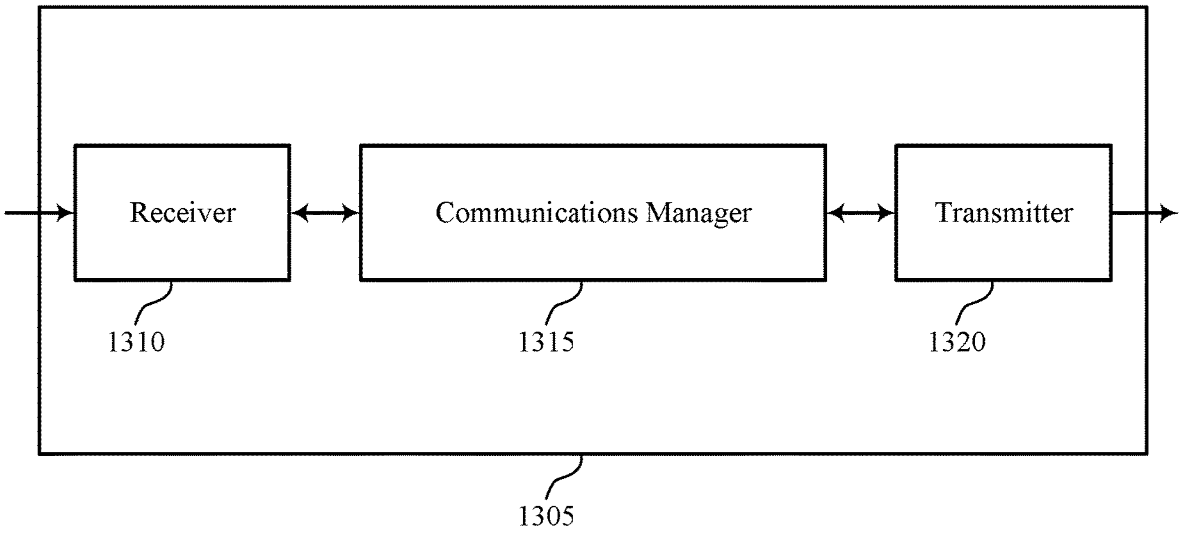
FIGS. 13 and 14 show block diagrams of devices that support aperiodic reference signal measurements for multiple TRPs in accordance with aspects of the present disclosure.

FIG. 13 shows a block diagram 1300 of a device 1305 that supports aperiodic reference signal measurements for multiple TRPs in accordance with aspects of the present disclosure. The device 1305 may be an example of aspects of a base station 105 as described herein. The base station 105 may be connected to multiple TRPs which may perform the processes described with reference to FIG. 13. Alternatively, in some aspects, the device 1305 may correspond to a network in communications with a UE 115. In such aspects, the network may include multiple TRPs which may perform the processes described with reference to FIG. 13. The multiple TRPs may be connected to one base station 105 or multiple base stations 105 in the network. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to aperiodic reference signal measurements for multiple TRPs, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit, to a UE, one or more control messages indicating a first list of trigger states associated with a first control resource set pool index and a second list of trigger states associated with a second control resource set pool index, identify a trigger state in the first list of trigger states linked to a configuration for the UE to use to receive one or more reference signal transmissions, and transmit, to the UE, downlink control information including a trigger state index in a control resource set having the first control resource set pool index, where the trigger state index corresponds to the identified trigger state in the first list of trigger states based on the control resource set having the first control resource set pool index. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other PLD, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
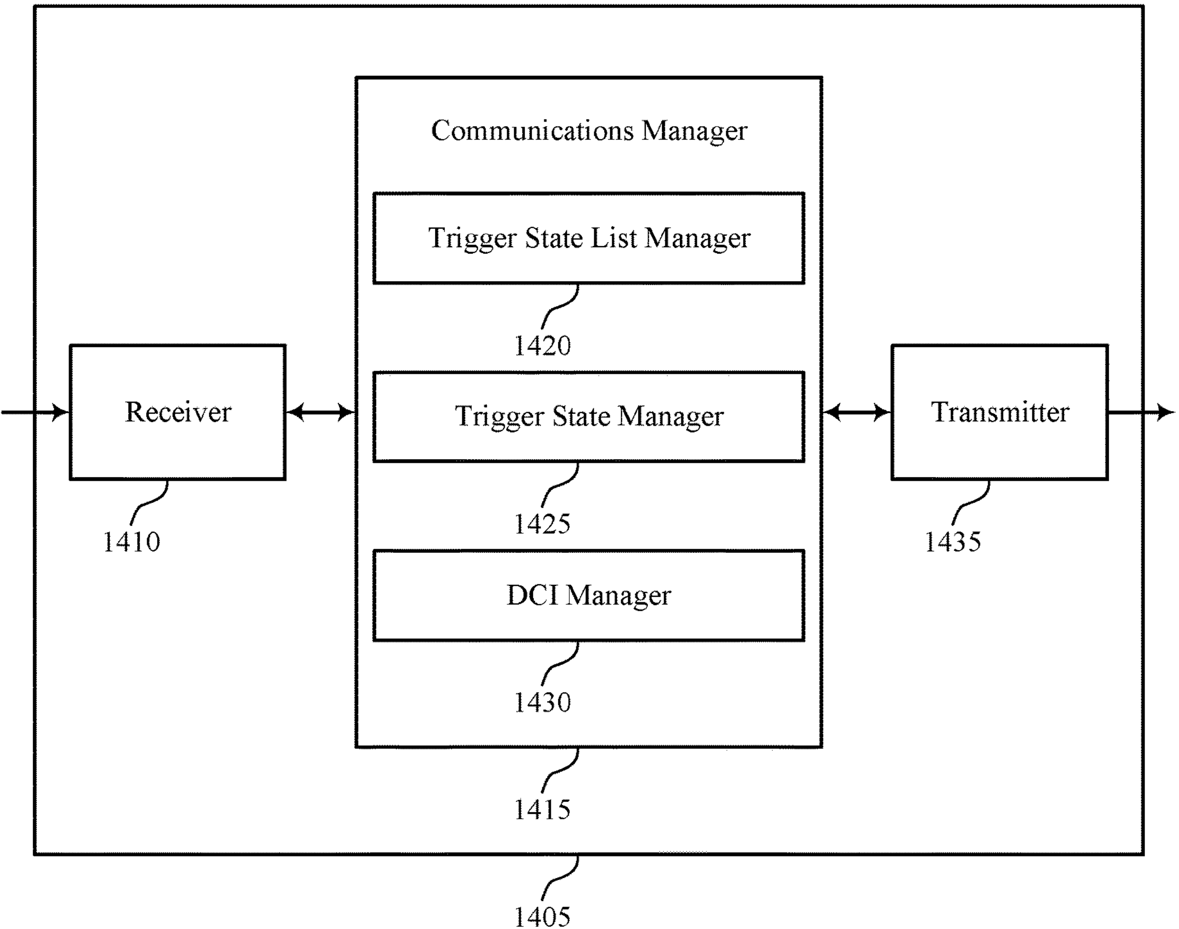

FIG. 14 shows a block diagram 1400 of a device 1405 that supports aperiodic reference signal measurements for multiple TRPs in accordance with aspects of the present disclosure. The device 1405 may be an example of aspects of a device 1305, or a base station 105 as described herein. The base station 105 may be connected to multiple TRPs which may perform the processes described with reference to FIG. 14. Alternatively, in some aspects, the device 1405 may correspond to a network in communications with a UE 115. In such aspects, the network may include multiple TRPs which may perform the processes described with reference to FIG. 14. The multiple TRPs may be connected to one base station 105 or multiple base stations 105 in the network. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to aperiodic reference signal measurements for multiple TRPs, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a trigger state list manager 1420, a trigger state manager 1425, and a DCI manager 1430. The communications manager 1415 may be an example of aspects of the communications manager 1610 described herein.

The trigger state list manager 1420 may transmit, to a UE, one or more control messages indicating a first list of trigger states associated with a first control resource set pool index and a second list of trigger states associated with a second control resource set pool index. The trigger state manager 1425 may identify a trigger state in the first list of trigger states linked to a configuration for the UE to use to receive one or more reference signal transmissions. The DCI manager 1430 may transmit, to the UE, downlink control information including a trigger state index in a control resource set having the first control resource set pool index, where the trigger state index corresponds to the identified trigger state in the first list of trigger states based on the control resource set having the first control resource set pool index.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
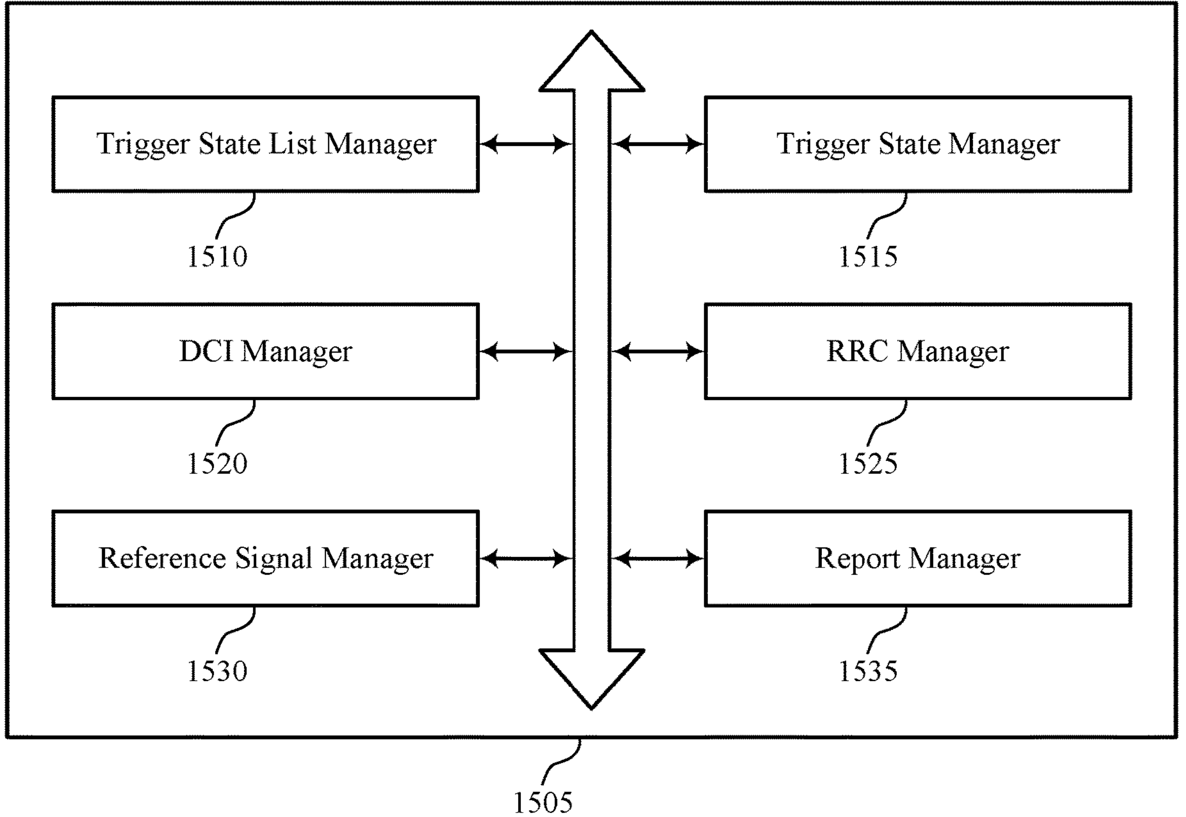
FIG. 15 shows a block diagram of a communications manager that supports aperiodic reference signal measurements for multiple TRPs in accordance with aspects of the present disclosure.

FIG. 15 shows a block diagram 1500 of a communications manager 1505 that supports aperiodic reference signal measurements for multiple TRPs in accordance with aspects of the present disclosure. The communications manager 1505 may be an example of aspects of a communications manager 1315, a communications manager 1415, or a communications manager 1610 described herein. The communications manager 1505 may include a trigger state list manager 1510, a trigger state manager 1515, a DCI manager 1520, a RRC manager 1525, a reference signal manager 1530, and a report manager 1535. Each of these modules may communicate, directly or indirectly, with one another (e.g., via one or more buses).

The trigger state list manager 1510 may transmit, to a UE, one or more control messages indicating a first list of trigger states associated with a first control resource set pool index and a second list of trigger states associated with a second control resource set pool index. The trigger state manager 1515 may identify a trigger state in the first list of trigger states linked to a configuration for the UE to use to receive one or more reference signal transmissions. The DCI manager 1520 may transmit, to the UE, downlink control information including a trigger state index in a control resource set having the first control resource set pool index, where the trigger state index corresponds to the identified trigger state in the first list of trigger states based on the control resource set having the first control resource set pool index.

In some examples, the trigger state list manager 1510 may transmit a first control message indicating the first list of trigger states associated with the first control resource set pool index. In some examples, the trigger state list manager 1510 may transmit a second control message indicating the second list of trigger states associated with the second control resource set pool index. In some cases, a field in the first control message indicates that the first control message corresponds to the first control resource set pool index, and where the first control message is linked to the first control resource set pool index based on the field. In some cases, a data channel in which the first control message is transmitted is associated with the first control resource set pool index, and where the first control message is linked to the first control resource set pool index based on the data channel being associated with the first control resource set pool index.

In some examples, the trigger state list manager 1510 may transmit a single control message including a first field indicating the first list of trigger states associated with the first control resource set pool index and a second field indicating the second list of trigger states associated with the second control resource set pool index. In some cases, the first field indicating the first list of trigger states is associated with the first control resource set pool index and the second field indicating the second list of trigger states is associated with the second control resource set pool index.

The RRC manager 1525 may transmit radio resource control signaling indicating a first set of one or more trigger states and a second set of one or more trigger states, where the first list of trigger states is sub-selected from the first set of one or more trigger states and the second list of trigger states is sub-selected from the second set of one or more trigger states. In some examples, the RRC manager 1525 may transmit radio resource control signaling indicating a single set of one or more trigger states, where the first list of trigger states and the second list of trigger states are each sub-selected from the single set of one or more trigger states. In some cases, the one or more control messages include MAC-CEs.

The reference signal manager 1530 may transmit one or more reference signal transmissions according to the configuration linked to the identified trigger state. In some cases, the one or more reference signal transmissions include CSI-RS transmissions, SSB transmissions, TRS transmissions, or PRS transmissions. The report manager 1535 may transmit, in the downlink control information, an indication that the UE is to transmit at least one report. In some examples, the reference signal manager 1530 may transmit one or more reference signal transmissions according to the configuration linked to the identified trigger state. In some examples, the report manager 1535 may receive the at least one report from the UE indicating measurements performed on the one or more reference signal transmissions based on transmitting the indication. In some cases, the downlink control information includes group-common downlink control information.

In some examples, the reference signal manager 1530 may transmit one or more PRS transmissions according to the configuration linked to the identified trigger state. In some examples, the report manager 1535 may receive at least one report from the UE indicating measurements performed on the positioning reference signal transmissions based on transmitting the one or more positioning reference signal transmissions. In some examples, the report manager 1535 may receive at least one report from the UE indicating a position of the UE based on transmitting the one or more positioning reference signal transmissions.

Figure 16:
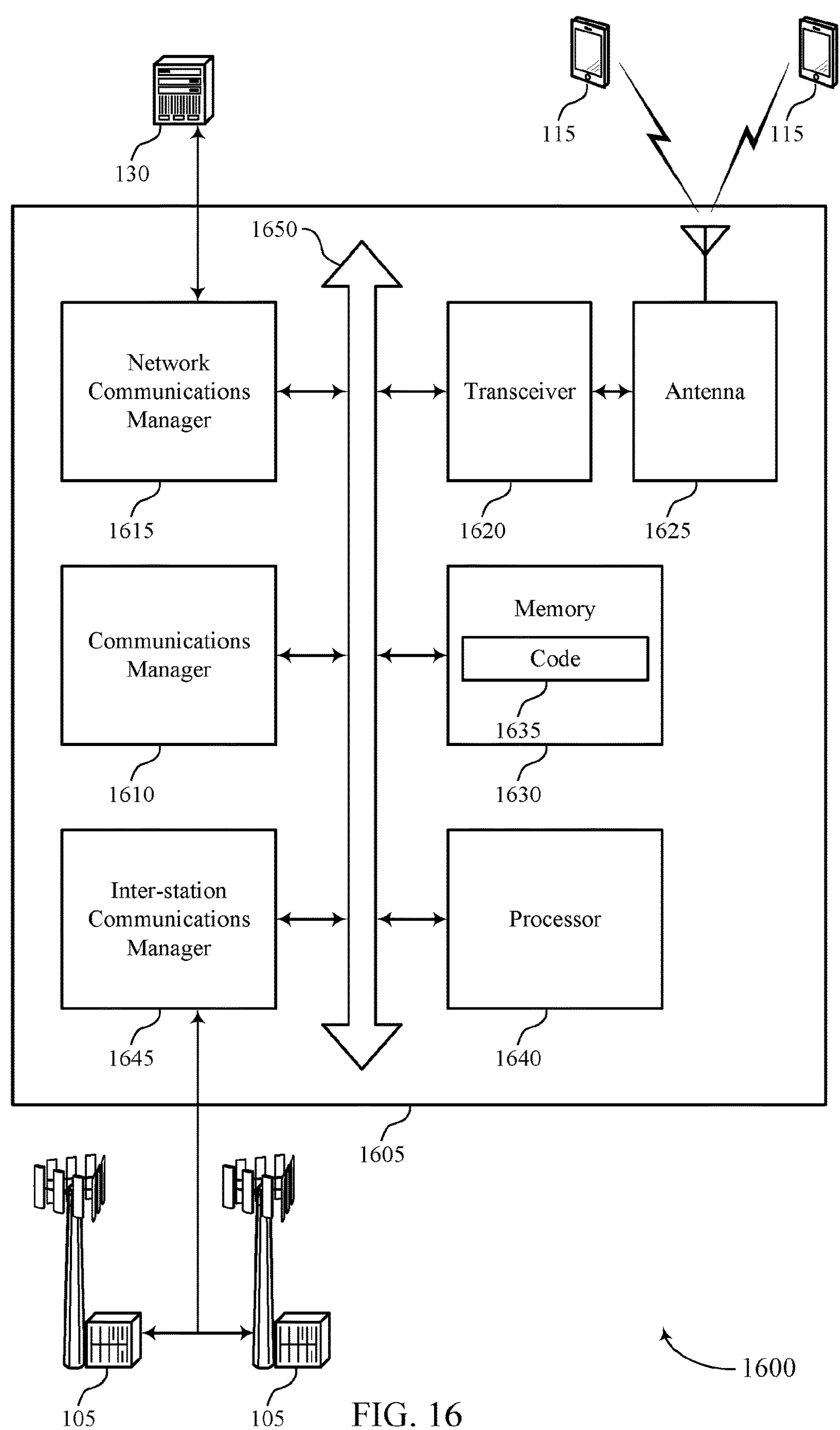
FIG. 16 shows a diagram of a system including a device that supports aperiodic reference signal measurements for multiple TRPs in accordance with aspects of the present disclosure.

FIG. 16 shows a diagram of a system 1600 including a device 1605 that supports aperiodic reference signal measurements for multiple TRPs in accordance with aspects of the present disclosure. The device 1605 may be an example of or include the components of device 1305, device 1405, or a base station 105 as described herein. The base station 105 may be connected to multiple TRPs which may perform the processes described with reference to FIG. 16. Alternatively, in some aspects, the device 1605 may correspond to a network in communications with a UE 115. In such aspects, the network may include multiple TRPs which may perform the processes described with reference to FIG. 16. The multiple TRPs may be connected to one base station 105 or multiple base stations 105 in the network. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit, to a UE, one or more control messages indicating a first list of trigger states associated with a first control resource set pool index and a second list of trigger states associated with a second control resource set pool index, identify a trigger state in the first list of trigger states linked to a configuration for the UE to use to receive one or more reference signal transmissions, and transmit, to the UE, downlink control information including a trigger state index in a control resource set having the first control resource set pool index, where the trigger state index corresponds to the identified trigger state in the first list of trigger states based on the control resource set having the first control resource set pool index.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting aperiodic reference signal measurements for multiple TRPs).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
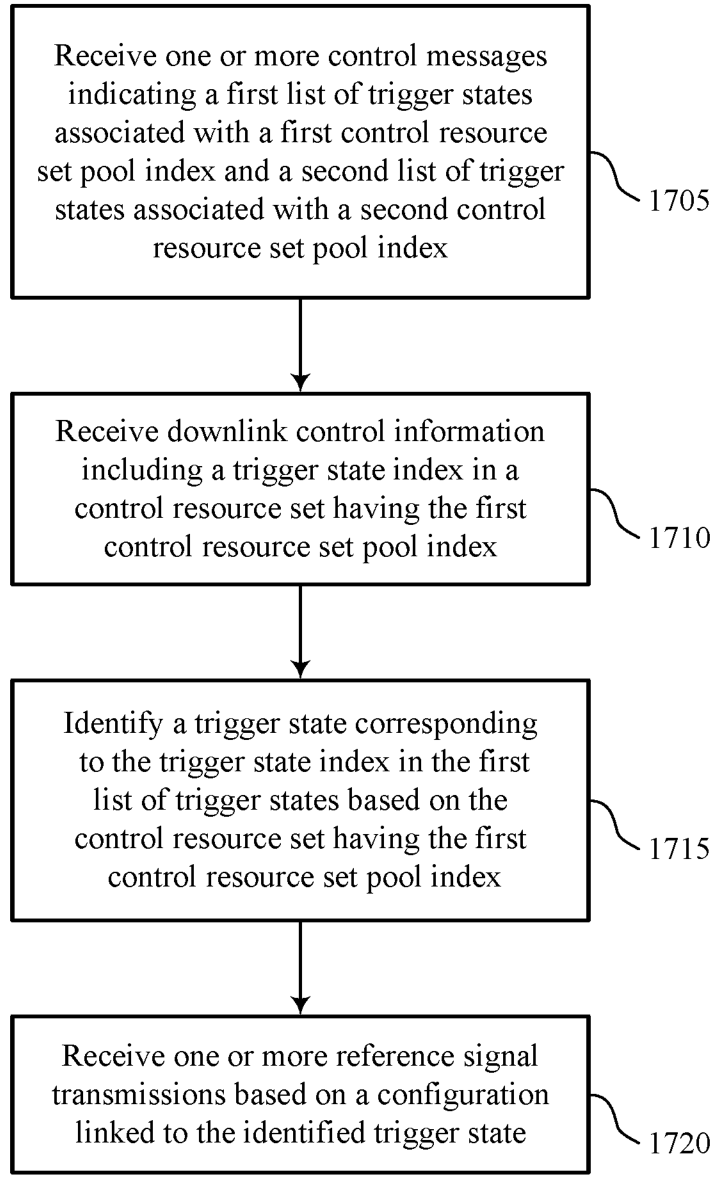
FIGS. 17 and 18 show flowcharts illustrating methods that support aperiodic reference signal measurements for multiple TRPs in accordance with aspects of the present disclosure.

FIG. 17 shows a flowchart illustrating a method 1700 that supports aperiodic reference signal measurements for multiple TRPs in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may receive one or more control messages indicating a first list of trigger states associated with a first control resource set pool index and a second list of trigger states associated with a second control resource set pool index. The operations of 1705 may be performed according to the methods described herein. In some examples, aspects of the operations of 1705 may be performed by a trigger state list manager as described with reference to FIGS. 9 through 12.

At 1710, the UE may receive downlink control information including a trigger state index in a control resource set having the first control resource set pool index. The operations of 1710 may be performed according to the methods described herein. In some examples, aspects of the operations of 1710 may be performed by a DCI manager as described with reference to FIGS. 9 through 12.

At 1715, the UE may identify a trigger state corresponding to the trigger state index in the first list of trigger states based on the control resource set having the first control resource set pool index. The operations of 1715 may be performed according to the methods described herein. In some examples, aspects of the operations of 1715 may be performed by a trigger state manager as described with reference to FIGS. 9 through 12.

At 1720, the UE may receive one or more reference signal transmissions based on a configuration linked to the identified trigger state. The operations of 1720 may be performed according to the methods described herein. In some examples, aspects of the operations of 1720 may be performed by a reference signal manager as described with reference to FIGS. 9 through 12.

Figure 18:
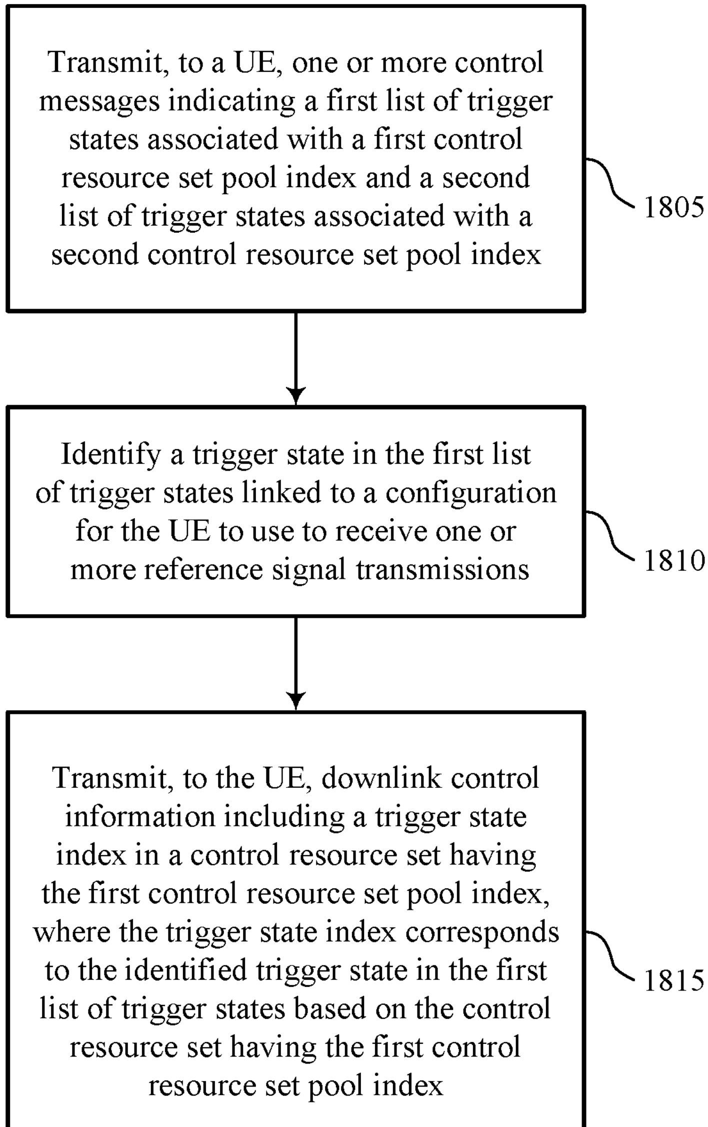

FIG. 18 shows a flowchart illustrating a method 1800 that supports aperiodic reference signal measurements for multiple TRPs in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1805, the base station may transmit, to a UE, one or more control messages indicating a first list of trigger states associated with a first control resource set pool index and a second list of trigger states associated with a second control resource set pool index. The operations of 1805 may be performed according to the methods described herein. In some examples, aspects of the operations of 1805 may be performed by a trigger state list manager as described with reference to FIGS. 13 through 16.

At 1810, the base station may identify a trigger state in the first list of trigger states linked to a configuration for the UE to use to receive one or more reference signal transmissions. The operations of 1810 may be performed according to the methods described herein. In some examples, aspects of the operations of 1810 may be performed by a trigger state manager as described with reference to FIGS. 13 through 16.

At 1815, the base station may transmit, to the UE, downlink control information including a trigger state index in a control resource set having the first control resource set pool index, where the trigger state index corresponds to the identified trigger state in the first list of trigger states based on the control resource set having the first control resource set pool index. The operations of 1815 may be performed according to the methods described herein. In some examples, aspects of the operations of 1815 may be performed by a DCI manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving one or more control messages indicating a first list of trigger states associated with a first control resource set pool index and a second list of trigger states associated with a second control resource set pool index; receiving downlink control information comprising a trigger state index in a control resource set having the first control resource set pool index; identifying a trigger state corresponding to the trigger state index in the first list of trigger states based at least in part on the control resource set having the first control resource set pool index; and receiving one or more reference signal transmissions based at least in part on a configuration linked to the identified trigger state.

Aspect 2: The method of aspect 1, wherein receiving the one or more control messages indicating the first list of trigger states and the second list of trigger states comprises: receiving a first control message indicating the first list of trigger states associated with the first control resource set pool index; and receiving a second control message indicating the second list of trigger states associated with the second control resource set pool index.

Aspect 3: The method of aspect 2, wherein a field in the first control message indicates that the first control message corresponds to the first control resource set pool index, and identifying the trigger state in the first list of trigger states is based at least in part on the field in the first control message indicating that the first control message corresponds to the first control resource set pool index.

Aspect 4: The method of any of aspects 2 through 3, wherein a data channel in which the first control message is received is associated with the first control resource set pool index, and identifying the trigger state in the first list of trigger states is based at least in part on the data channel being associated with the first control resource set pool index.

Aspect 5: The method of any of aspects 1 through 4, wherein receiving the one or more control messages indicating the first list of trigger states and the second list of trigger states comprises: receiving a single control message comprising a first field indicating the first list of trigger states associated with the first control resource set pool index and a second field indicating the second list of trigger states associated with the second control resource set pool index.

Aspect 6: The method of aspect 5, wherein the first field indicating the first list of trigger states is associated with the first control resource set pool index, and identifying the trigger state in the first list of trigger states is based at least in part on the first field being associated with the first control resource set pool index.

Aspect 7: The method of any of aspects 1 through 6, further comprising: receiving radio resource control signaling indicating a first set of one or more trigger states and a second set of one or more trigger states, wherein the first list of trigger states is sub-selected from the first set of one or more trigger states and the second list of trigger states is sub-selected from the second set of one or more trigger states.

Aspect 8: The method of any of aspects 1 through 7, further comprising: receiving radio resource control signaling indicating a single set of one or more trigger states, wherein the first list of trigger states and the second list of trigger states are each sub-selected from the single set of one or more trigger states.

Aspect 9: The method of any of aspects 1 through 8, wherein the one or more control messages comprise medium access control (MAC) control elements.

Aspect 10: The method of any of aspects 1 through 9, further comprising: selecting the configuration for receiving the one or more reference signal transmissions based at least in part on the identified trigger state; receiving the one or more reference signal transmissions on resources linked to the selected configuration; and performing measurements on the one or more reference signal transmissions based at least in part on receiving the one or more reference signal transmissions.

Aspect 11: The method of aspect 10, wherein the one or more reference signal transmissions comprise channel state information reference signal transmissions, synchronization signal block transmissions, tracking reference signal transmissions, or positioning reference signal transmissions.

Aspect 12: The method of any of aspects 1 through 11, further comprising: receiving, in the downlink control information, an indication that the UE is to transmit at least one report; and transmitting the at least one report based at least in part on the received one or more reference signal transmissions and the indication that the UE is to transmit the at least one report.

Aspect 13: The method of any of aspects 1 through 12, wherein the downlink control information comprises group-common downlink control information.

Aspect 14: The method of any of aspects 1 through 13, wherein the one or more reference signal transmissions comprise positioning reference signal transmissions, the method further comprising: performing measurements on the positioning reference signal transmissions; and transmitting at least one report indicating the measurements performed on the positioning reference signal transmissions.

Aspect 15: The method of aspect 14, further comprising: computing a position of the UE based at least in part on the measurements; and transmitting at least one report indicating the position of the UE.

Aspect 16: A method for wireless communication, comprising: transmitting, to a UE, one or more control messages indicating a first list of trigger states associated with a first control resource set pool index and a second list of trigger states associated with a second control resource set pool index; identifying a trigger state in the first list of trigger states linked to a configuration for the UE to use to receive one or more reference signal transmissions; and transmitting, to the UE, downlink control information comprising a trigger state index in a control resource set having the first control resource set pool index, wherein the trigger state index corresponds to the identified trigger state in the first list of trigger states based at least in part on the control resource set having the first control resource set pool index.

Aspect 17: The method of aspect 16, wherein transmitting the one or more control messages indicating the first list of trigger states and the second list of trigger states comprises: transmitting a first control message indicating the first list of trigger states associated with the first control resource set pool index; and transmitting a second control message indicating the second list of trigger states associated with the second control resource set pool index.

Aspect 18: The method of aspect 17, wherein a field in the first control message indicates that the first control message corresponds to the first control resource set pool index, and the first control message is linked to the first control resource set pool index based at least in part on the field.

Aspect 19: The method of any of aspects 17 through 18, wherein a data channel in which the first control message is transmitted is associated with the first control resource set pool index, and the first control message is linked to the first control resource set pool index based at least in part on the data channel being associated with the first control resource set pool index.

Aspect 20: The method of any of aspects 16 through 19, wherein transmitting the one or more control messages indicating the first list of trigger states and the second list of trigger states comprises: transmitting a single control message comprising a first field indicating the first list of trigger states associated with the first control resource set pool index and a second field indicating the second list of trigger states associated with the second control resource set pool index.

Aspect 21: The method of aspect 20, wherein the first field indicating the first list of trigger states is associated with the first control resource set pool index and the second field indicating the second list of trigger states is associated with the second control resource set pool index.

Aspect 22: The method of any of aspects 16 through 21, further comprising: transmitting radio resource control signaling indicating a first set of one or more trigger states and a second set of one or more trigger states, wherein the first list of trigger states is sub-selected from the first set of one or more trigger states and the second list of trigger states is sub-selected from the second set of one or more trigger states.

Aspect 23: The method of any of aspects 16 through 22, further comprising: transmitting radio resource control signaling indicating a single set of one or more trigger states, wherein the first list of trigger states and the second list of trigger states are each sub-selected from the single set of one or more trigger states.

Aspect 24: The method of any of aspects 16 through 23, wherein the one or more control messages comprise medium access control (MAC) control elements.

Aspect 25: The method of any of aspects 16 through 24, further comprising: transmitting one or more reference signal transmissions according to the configuration linked to the identified trigger state.

Aspect 26: The method of aspect 25, wherein the one or more reference signal transmissions comprise channel state information reference signal transmissions, synchronization signal block transmissions, tracking reference signal transmissions, or positioning reference signal transmissions.

Aspect 27: The method of any of aspects 16 through 26, further comprising: transmitting, in the downlink control information, an indication that the UE is to transmit at least one report; transmitting one or more reference signal transmissions according to the configuration linked to the identified trigger state; and receiving the at least one report from the UE indicating measurements performed on the one or more reference signal transmissions based at least in part on transmitting the indication.

Aspect 28: The method of any of aspects 16 through 27, wherein the downlink control information comprises group-common downlink control information.

Aspect 29: The method of any of aspects 16 through 28, further comprising: transmitting one or more positioning reference signal transmissions according to the configuration linked to the identified trigger state; and receiving at least one report from the UE indicating measurements performed on the one or more positioning reference signal transmissions based at least in part on transmitting the one or more positioning reference signal transmissions.

Aspect 30: The method of any of aspects 16 through 29, further comprising: transmitting one or more positioning reference signal transmissions according to the configuration linked to the identified trigger state; and receiving at least one report from the UE indicating a position of the UE based at least in part on transmitting the one or more positioning reference signal transmissions.

Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication, comprising a processor; memory coupled with the processor; and instructions stored in the memory and executable by the processor to cause the apparatus to perform a method of any of aspects 16 through 30.

Aspect 35: An apparatus for wireless communication, comprising at least one means for performing a method of any of aspects 16 through 30.

Aspect 36: A non-transitory computer-readable medium storing code for wireless communication, the code comprising instructions executable by a processor to perform a method of any of aspects 16 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:

one or more processors, one or more memories coupled with the one or more processors; and instructions stored in the one or more memories and executable by the one or more processors to cause the apparatus to:

receive one or more control messages indicating a first list of trigger states associated with a first control resource set pool index and a second list of trigger states associated with a second control resource set pool index;

receive downlink control information comprising a trigger state index in a control resource set having the first control resource set pool index;

identify a trigger state corresponding to the trigger state index in the first list of trigger states based at least in part on the control resource set having the first control resource set pool index; and receive one or more reference signal transmissions based at least in part on a configuration linked to the identified trigger state.

2. The apparatus of claim 1, wherein the instructions to receive the one or more control messages indicating the first list of trigger states and the second list of trigger states are executable by the one or more processors to cause the apparatus to:

receive a first control message indicating the first list of trigger states associated with the first control resource set pool index; and receive a second control message indicating the second list of trigger states associated with the second control resource set pool index.

3. The apparatus of claim 2, wherein a field in the first control message indicates that the first control message corresponds to the first control resource set pool index, and wherein identifying the trigger state in the first list of trigger states is based at least in part on the field in the first control message indicating that the first control message corresponds to the first control resource set pool index.

4. The apparatus of claim 2, wherein a data channel in which the first control message is received is associated with the first control resource set pool index, and wherein identifying the trigger state in the first list of trigger states is based at least in part on the data channel being associated with the first control resource set pool index.

5. The apparatus of claim 1, wherein the instructions to receive the one or more control messages indicating the first list of trigger states and the second list of trigger states are executable by the one or more processors to cause the apparatus to:

receive a single control message comprising a first field indicating the first list of trigger states associated with the first control resource set pool index and a second field indicating the second list of trigger states associated with the second control resource set pool index.

6. The apparatus of claim 5, wherein the first field indicating the first list of trigger states is associated with the first control resource set pool index, and wherein identifying the trigger state in the first list of trigger states is based at least in part on the first field being associated with the first control resource set pool index.

7. The apparatus of claim 1, wherein the instructions are further executable by the one or more processors to cause the apparatus to:

receive radio resource control signaling indicating a first set of one or more trigger states and a second set of one or more trigger states, wherein the first list of trigger states is sub-selected from the first set of one or more trigger states and the second list of trigger states is sub-selected from the second set of one or more trigger states.

8. The apparatus of claim 1, wherein the instructions are further executable by the one or more processors to cause the apparatus to:

receive radio resource control signaling indicating a single set of one or more trigger states, wherein the first list of trigger states and the second list of trigger states are each sub-selected from the single set of one or more trigger states.

9. The apparatus of claim 1, wherein the instructions are further executable by the one or more processors to cause the apparatus to:

select the configuration for receiving the one or more reference signal transmissions based at least in part on the identified trigger state;

receive the one or more reference signal transmissions on resources linked to the selected configuration; and perform measurements on the one or more reference signal transmissions based at least in part on receiving the one or more reference signal transmissions.

10. The apparatus of claim 1, wherein the instructions are further executable by the one or more processors to cause the apparatus to:

receive, in the downlink control information, an indication that the UE is to transmit at least one report; and transmit the at least one report based at least in part on the received one or more reference signal transmissions and the indication that the UE is to transmit the at least one report.

11. The apparatus of claim 1, wherein the one or more reference signal transmissions comprise positioning reference signal transmissions, and the instructions are further executable by the one or more processors to cause the apparatus to:

perform measurements on the positioning reference signal transmissions; and transmit at least one report indicating the measurements performed on the positioning reference signal transmissions.

12. The apparatus of claim 11, wherein the instructions are further executable by the one or more processors to cause the apparatus to:

compute a position of the UE based at least in part on the measurements; and transmit at least one report indicating the position of the UE.

13. An apparatus for wireless communication, comprising:

one or more processors, one or more memories coupled with the one or more processors; and instructions stored in the one or more memories and executable by the one or more processors to cause the apparatus to:

transmit, to a user equipment (UE), one or more control messages indicating a first list of trigger states associated with a first control resource set pool index and a second list of trigger states associated with a second control resource set pool index;

identify a trigger state in the first list of trigger states linked to a configuration for the UE to use to receive one or more reference signal transmissions; and transmit, to the UE, downlink control information comprising a trigger state index in a control resource set having the first control resource set pool index, wherein the trigger state index corresponds to the identified trigger state in the first list of trigger states based at least in part on the control resource set having the first control resource set pool index.

14. The apparatus of claim 13, wherein the instructions to transmit the one or more control messages indicating the first list of trigger states and the second list of trigger states are executable by the one or more processors to cause the apparatus to:

transmit a first control message indicating the first list of trigger states associated with the first control resource set pool index; and transmit a second control message indicating the second list of trigger states associated with the second control resource set pool index.

15. The apparatus of claim 14, wherein a field in the first control message indicates that the first control message corresponds to the first control resource set pool index, and wherein the first control message is linked to the first control resource set pool index based at least in part on the field.

16. The apparatus of claim 14, wherein a data channel in which the first control message is transmitted is associated with the first control resource set pool index, and wherein the first control message is linked to the first control resource set pool index based at least in part on the data channel being associated with the first control resource set pool index.

17. The apparatus of claim 13, wherein the instructions to transmit the one or more control messages indicating the first list of trigger states and the second list of trigger states are executable by the one or more processors to cause the apparatus to:

transmit a single control message comprising a first field indicating the first list of trigger states associated with the first control resource set pool index and a second field indicating the second list of trigger states associated with the second control resource set pool index.

18. The apparatus of claim 17, wherein the first field indicating the first list of trigger states is associated with the first control resource set pool index and the second field indicating the second list of trigger states is associated with the second control resource set pool index.

19. The apparatus of claim 13, wherein the instructions are further executable by the one or more processors to cause the apparatus to:

transmit radio resource control signaling indicating a first set of one or more trigger states and a second set of one or more trigger states, wherein the first list of trigger states is sub-selected from the first set of one or more trigger states and the second list of trigger states is sub-selected from the second set of one or more trigger states.

20. The apparatus of claim 13, wherein the instructions are further executable by the one or more processors to cause the apparatus to:

transmit radio resource control signaling indicating a single set of one or more trigger states, wherein the first list of trigger states and the second list of trigger states are each sub-selected from the single set of one or more trigger states.

21. The apparatus of claim 13, wherein the instructions are further executable by the one or more processors to cause the apparatus to:

transmit the one or more reference signal transmissions according to the configuration linked to the identified trigger state.

22. The apparatus of claim 13, wherein the instructions are further executable by the one or more processors to cause the apparatus to:

transmit, in the downlink control information, an indication that the UE is to transmit at least one report;

transmit the one or more reference signal transmissions according to the configuration linked to the identified trigger state; and receive the at least one report from the UE indicating measurements performed on the one or more reference signal transmissions based at least in part on transmitting the indication.

23. The apparatus of claim 13, wherein the instructions are further executable by the one or more processors to cause the apparatus to:

transmit one or more positioning reference signal transmissions according to the configuration linked to the identified trigger state; and receive at least one report from the UE indicating measurements performed on the one or more positioning reference signal transmissions based at least in part on transmitting the one or more positioning reference signal transmissions.

24. The apparatus of claim 13, wherein the instructions are further executable by the one or more processors to cause the apparatus to:

transmit one or more positioning reference signal transmissions according to the configuration linked to the identified trigger state; and receive at least one report from the UE indicating a position of the UE based at least in part on transmitting the one or more positioning reference signal transmissions.

25. A method for wireless communication at a user equipment (UE), comprising:

receiving one or more control messages indicating a first list of trigger states associated with a first control resource set pool index and a second list of trigger states associated with a second control resource set pool index;

receiving downlink control information comprising a trigger state index in a control resource set having the first control resource set pool index;

identifying a trigger state corresponding to the trigger state index in the first list of trigger states based at least in part on the control resource set having the first control resource set pool index; and receiving one or more reference signal transmissions based at least in part on a configuration linked to the identified trigger state.

26. The method of claim 25, wherein receiving the one or more control messages indicating the first list of trigger states and the second list of trigger states comprises:

receiving a first control message indicating the first list of trigger states associated with the first control resource set pool index; and receiving a second control message indicating the second list of trigger states associated with the second control resource set pool index.

27. The method of claim 25, wherein receiving the one or more control messages indicating the first list of trigger states and the second list of trigger states comprises:

receiving a single control message comprising a first field indicating the first list of trigger states associated with the first control resource set pool index and a second field indicating the second list of trigger states associated with the second control resource set pool index.

28. A method for wireless communication, comprising:

transmitting, to a user equipment (UE), one or more control messages indicating a first list of trigger states associated with a first control resource set pool index and a second list of trigger states associated with a second control resource set pool index;

identifying a trigger state in the first list of trigger states linked to a configuration for the UE to use to receive one or more reference signal transmissions; and transmitting, to the UE, downlink control information comprising a trigger state index in a control resource set having the first control resource set pool index, wherein the trigger state index corresponds to the identified trigger state in the first list of trigger states based at least in part on the control resource set having the first control resource set pool index.

29. The method of claim 28, wherein transmitting the one or more control messages indicating the first list of trigger states and the second list of trigger states comprises:

transmitting a first control message indicating the first list of trigger states associated with the first control resource set pool index; and transmitting a second control message indicating the second list of trigger states associated with the second control resource set pool index.

30. The method of claim 28, wherein transmitting the one or more control messages indicating the first list of trigger states and the second list of trigger states comprises:

transmitting a single control message comprising a first field indicating the first list of trigger states associated with the first control resource set pool index and a second field indicating the second list of trigger states associated with the second control resource set pool index.

* * * * *